United States Patent [19]
Ozaki et al.

[11] Patent Number: 5,912,771
[45] Date of Patent: Jun. 15, 1999

[54] ZOOM LENS SYSTEM

[75] Inventors: Hiroyasu Ozaki; Takayuki Ito, both of Tokyo, Japan

[73] Assignee: Asahi Kogaku Kogyo Kabushiki Kaisha, Tokyo, Japan

[21] Appl. No.: 08/935,894

[22] Filed: Sep. 23, 1997

[30]    Foreign Application Priority Data

Sep. 24, 1996  [JP]  Japan ................................ 8-251636

[51] Int. Cl.$^6$ ................................................. G02B 15/14
[52] U.S. Cl. ......................... 359/690; 359/687; 359/686
[58] Field of Search ............................... 359/686–687, 359/690

[56]            References Cited

U.S. PATENT DOCUMENTS 4,345,821  8/1982  Tachihara ........................... 350/427
5,543,969  8/1996  Ito ..................................... 359/690

FOREIGN PATENT DOCUMENTS 6138390  5/1994  Japan .

Primary Examiner—Georgia Epps
Assistant Examiner—Michael Lucas
Attorney, Agent, or Firm—Greenblum & Bernstein, P.L.C

[57]            ABSTRACT

A zoom lens system includes a positive first lens group, a negative second lens group, and a positive third lens group. The second and third lens groups move to perform a zooming operation. The zoom lens system satisfies the relationships $0<\log Z_2/\log Z<0.4$; $0.25<d_{1-2}/f_W<0.55$; and $3<L_{2-3}/f_W<4.6$, wherein "$Z_2$" designates the ratio defined by the lateral magnification of the second lens group at the longest focal length extremity to the lateral magnification of the second lens group at the shortest focal length extremity, "$Z$" represents the ratio defined by the longest focal length of the entire zoom lens system to the shortest focal length of the entire zoom lens system, "$f_W$" represents the shortest focal length of the entire zoom lens system, "$d_{1-2}$" represents the distance between the last lens surface of the first lens group and the first lens surface of the second lens group at the shortest focal length extremity, and "$L_{2-3}$" represents the distance between the principal points of the second and third lens groups at the shortest focal length extremity.

8 Claims, 31 Drawing Sheets

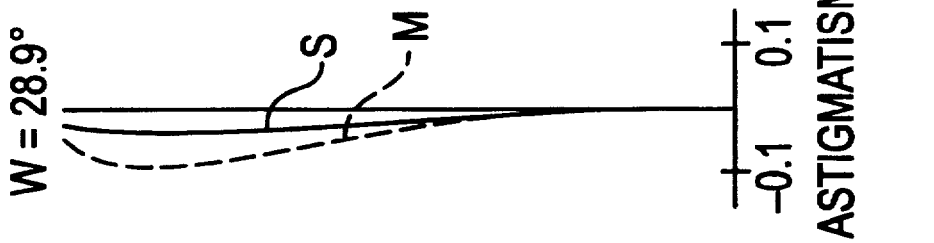
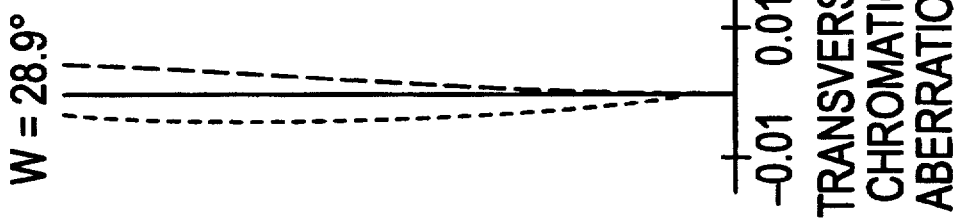
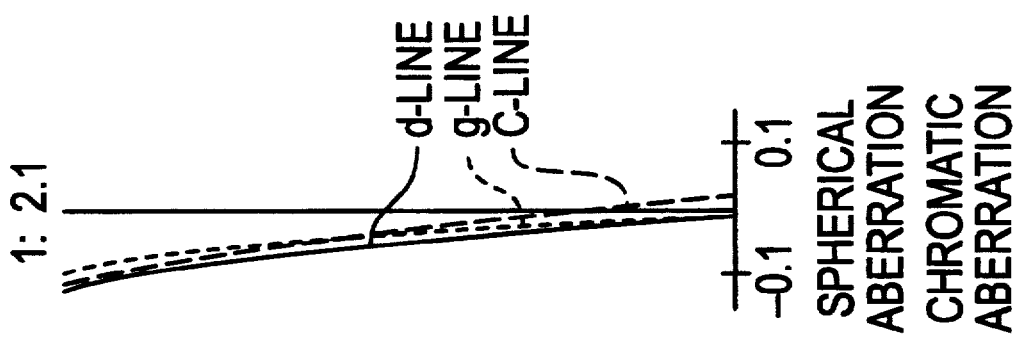

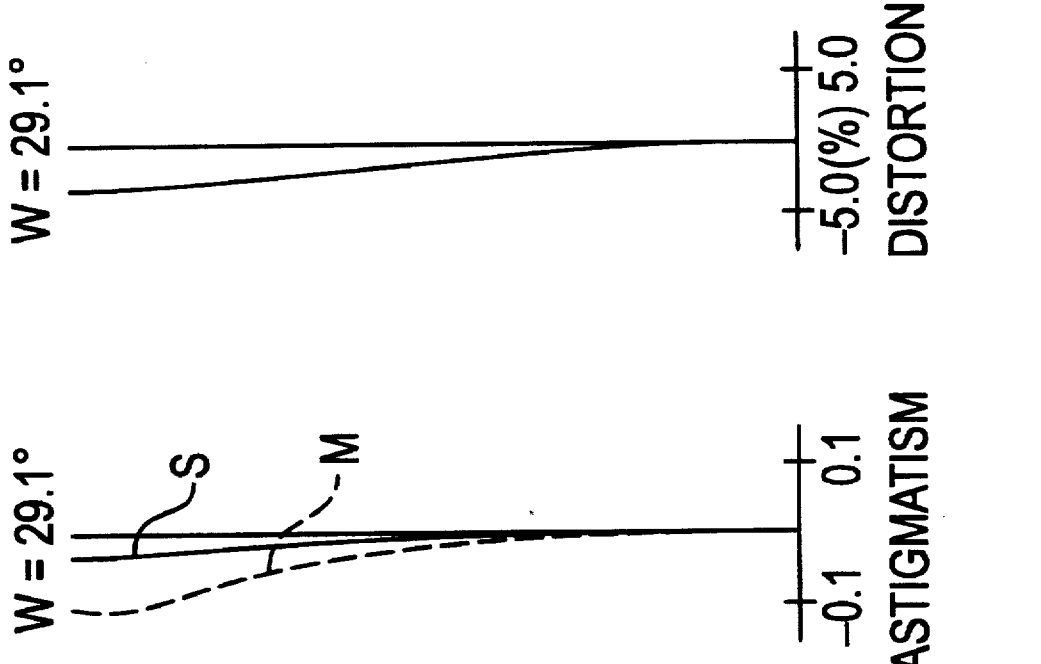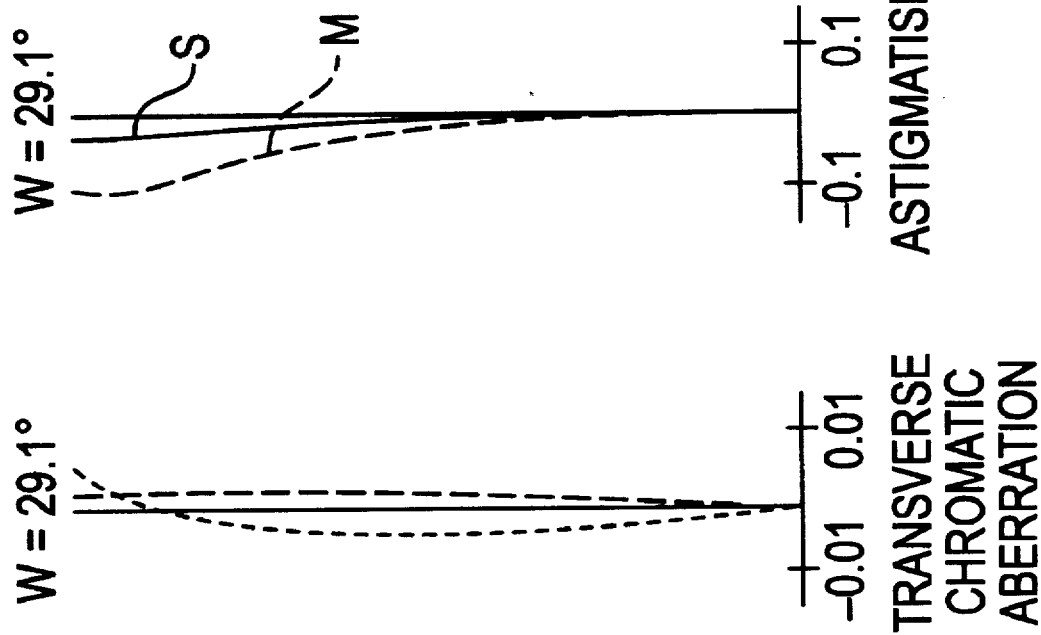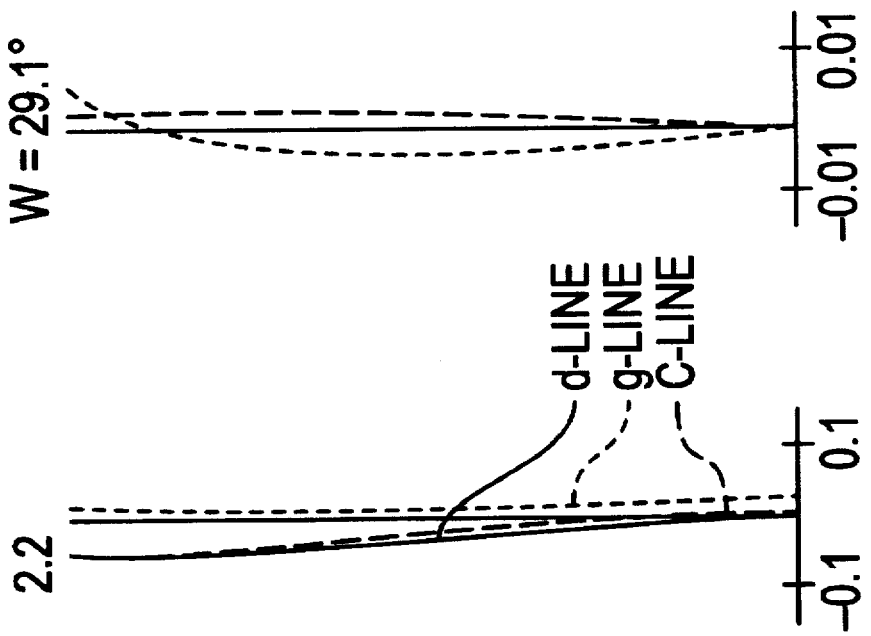

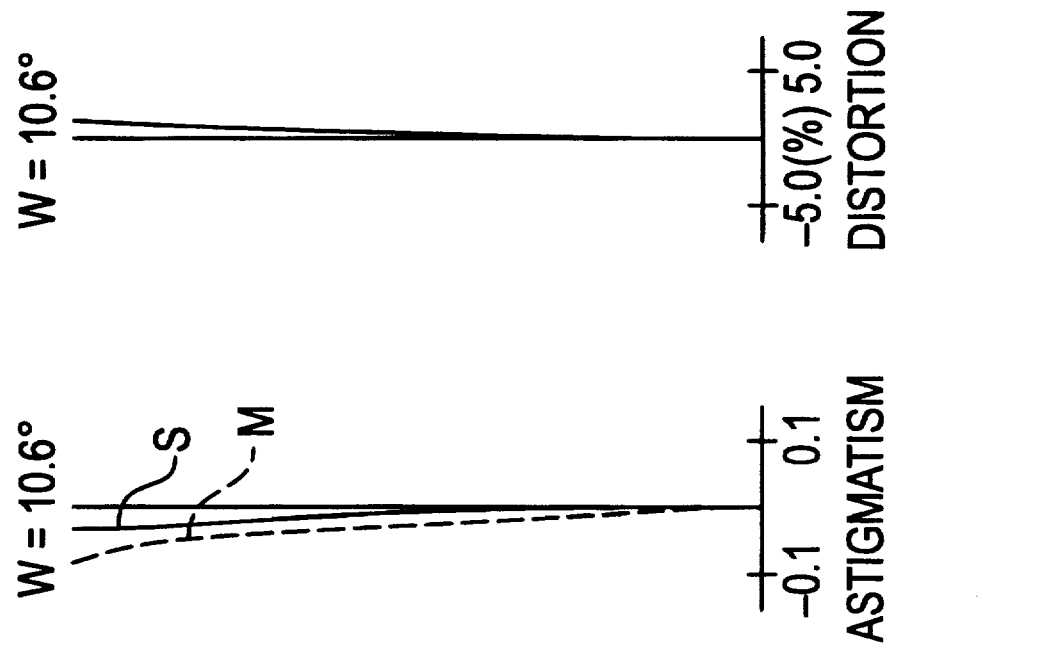

ZOOM LENS SYSTEM

BACKGROUND OF THE INVENTION

1. Field of the Invention

The present invention relates to a zoom lens system having a zoom ratio of approximately 3, for a small video camera or a digital camera, etc.

2. Description of the Related Art

There has been a need for the miniaturization of video cameras, digital cameras, etc. In order to meet this need, it is necessary to reduce either the length of the entire zoom lens, or the diameter of the front lens.

A retrofocus type small zoom lens is known having two lens groups consisting of a first lens group having a negative power and a second lens group having a positive power, arranged in this order from the object side.

However, in this known retrofocus type zoom lens having two lens groups, since zooming is carried out only by utilizing the second lens group as a master lens, it is difficult to increase the zoom ratio. Moreover, if the F-number is reduced (aperture is increased) in the retrofocus type zoom lens, the diameter of the rear lens group is increased and high-order spherical aberrations are produced.

A four-lens group type zoom lens is also known having a positive first lens group, a negative second lens group (variator), a negative third lens group (compensator), and a positive fourth lens group (master lens), arranged in this order from the object side. However, in this type of zoom lens, since zooming is effected chiefly by utilizing the second lens group as a variator, the length of the whole lens system is increased, the diameter of the frontmost lens is increased, and, it is difficult to increase the angle of view.

SUMMARY OF THE INVENTION

It is an object of the present invention to provide a small zoom lens system having a zoom ratio of approximately 3, for a video camera or a digital camera, etc.

To achieve the object mentioned above, according to the present invention, there is provided a zoom lens system having a positive first lens group, a negative second lens group, and a positive third lens group, arranged in this order from the object side. The second and third lens groups are moved to carry out the zooming operation, and the zoom lens system satisfies the following relationships (1) through (3):

$$0 < \log Z_2 / \log Z < 0.4 \quad (1)$$

$$0.25 < d_{1\text{-}2}/f_w < 0.55 \quad (2)$$

$$3 < L_{2\text{-}3}/f_w < 4.6 \quad (3)$$

wherein $Z_2$ represents the ratio of the lateral magnification of the second lens group at the longest focal length (telephoto) extremity to the lateral magnification of the second lens group at the shortest focal length (wide-angle) extremity, Z represents the ratio of the longest focal length of the entire lens system to the shortest focal length of the entire lens system, $f_W$ represents the shortest focal length of the entire lens system, $d_{1\text{-}2}$ represents the distance between the last lens surface of the first lens group and the first lens surface of the second lens group at the shortest focal length extremity, $L_{2\text{-}3}$ represents the distance between the principal points of the second and third lens groups at the shortest focal length extremity.

Preferably, the zoom lens system also satisfies the following relationship (4):

$$0.6 < f_{BW}/f_W < 1.5 \quad (4)$$

wherein $f_{BW}$ represents the reduced back focal distance at the shortest focal length extremity.

Preferably, the third lens group includes a cemented lens consisting of a positive lens element and a negative lens element cemented thereto and satisfies the following relationships (5) and (6):

$$0.16 < Nn - Np \quad (5)$$

$$0.2 < f_W/|r_c| < 0.7 \quad (r_c < 0) \quad (6)$$

wherein

Nn represents refractive index of the negative lens element of the cemented lens, Np represents the refractive index of the positive lens element of the cemented lens, $r_c$ represents the radius of curvature of the cemented surface of the cemented lens.

A diaphragm is provided, preferably between the second lens group and the third lens group. The diaphragm is movable together with the third lens group or is immovably provided between the second and third lens groups so as not to move during zooming.

The focusing can be carried out by the second lens group. The first lens group does not move during the zooming operation or focusing operation.

The present disclosure relates to subject matter contained in Japanese Patent Application No. 8-251636 (filed on Sep. 24, 1996) which is expressly incorporated herein by reference in its entirety.

BRIEF DESCRIPTION OF THE DRAWINGS

The invention will be described below in detail with reference to the accompanying drawings, in which:

FIGS. 3A, 3B, 3C and 3D show aberration diagrams of the zoom lens system shown in FIG. 2;

FIGS. 27A, 27B, 27C and 27D show aberration diagrams of the zoom lens system shown in FIG. 26;

DESCRIPTION OF THE PREFERRED EMBODIMENTS

Figure 1:
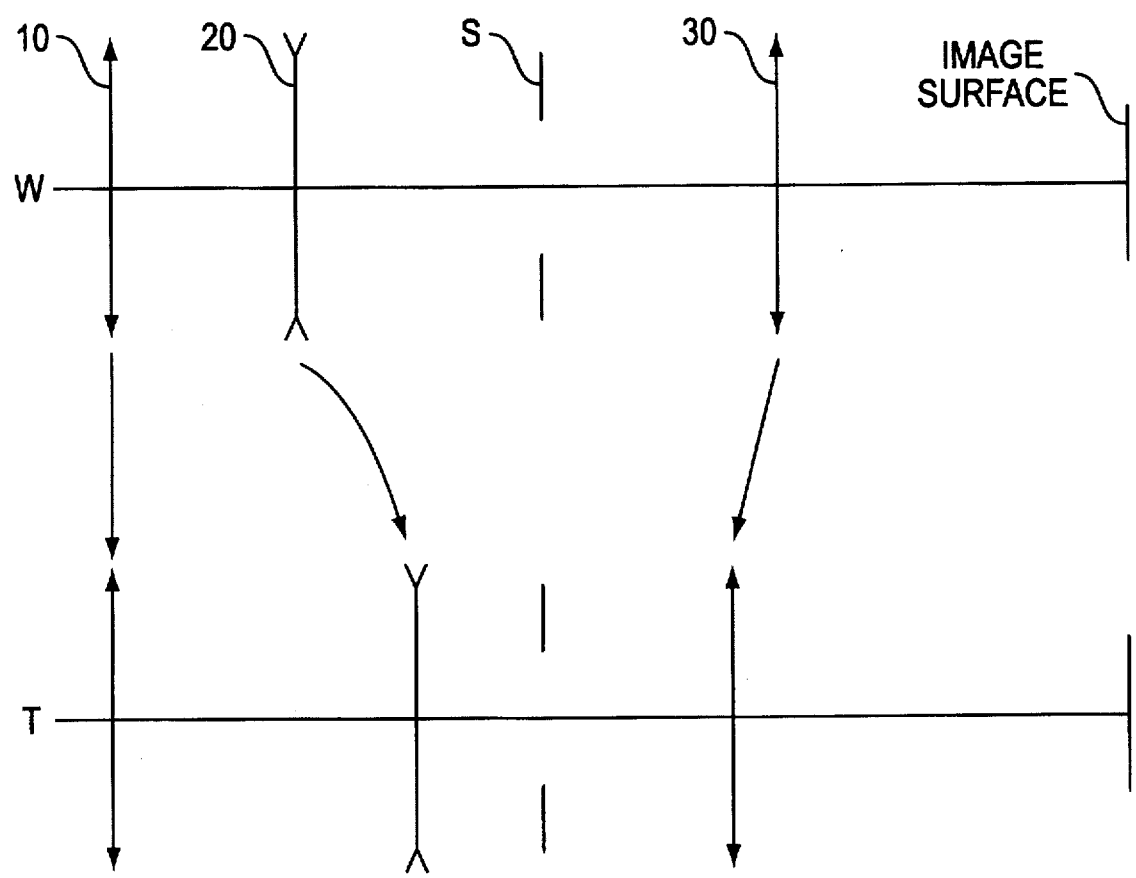
FIG. 1 shows the lens arrangement of a zoom lens system and tracks of movement of the lens groups thereof, according to the present invention.

As shown in FIG. 1, a zoom lens system according to the present embodiment includes a positive first lens group 10, a negative second lens group 20, a diaphragm (stop) S, and a third lens group 30, arranged in this order from the object side (the left side as viewed in FIG. 1).

Upon zooming, the second and third lens groups 20 and 30 are moved to vary the zoom ratio. According to the tracks of the movement of the three lens groups shown in FIG. 1, upon zooming from the shortest focal length extremity toward the longest focal length extremity, the second lens group 20 is moved from the object side toward the image side (the left side as viewed in FIG. 1) and the third lens group 30 is moved from the image side toward the object side, respectively. Focusing is effected by the second lens group 20. The first lens group 10 does not move during the zooming or focusing. The diaphragm S is secured to the front portion of the third lens group 30 to move together therewith or is immovably provided between the second and third lens groups 20 and 30.

In the three-lens group type zoom lens according to the present embodiment, the third lens group 30 functions not only as a master lens but also as a variator to vary the magnification, and the second lens group 20 supplements the magnification varying operation and compensates for the deviation of the focus (out-of-focus) caused during the zooming.

Condition (1) specifies the magnification varying function of the second lens group. As mentioned above, the zooming is effected chiefly by the third lens group and supplemented by the second lens group. If the ratio defined in condition (1) is smaller than the lower limit, the second lens group can no longer contribute to the magnification varying function, so that the zooming is carried out only by the third lens group. Consequently, it is difficult to obtain the zoom ratio of approximately 3. Moreover, the movement of the third lens group is so large that the diameter thereof must be increased and it becomes difficult to sufficiently correct spherical aberrations on the long focal length side.

If the ratio defined in condition (1) is larger than the upper limit, the contribution of the second lens group to the magnification varying function is too great and it is difficult to correct the aberrations produced during the zooming operation.

Condition (2) specifies the distance between the first and second lens groups. If the ratio defined in condition (2) is smaller than the lower limit, the second lens group. interferes with the first lens group during the focusing operation by the second lens group. If the ratio defined in condition (2) exceeds the upper limit, the back focal distance is too small to provide an accommodation space for filters, etc., in front of the CCD.

Condition (3) specifies the distance between the principal points of the second and third lens groups. If the ratio is below the lower limit specified in condition (3), the power of the second and third lens groups is too large to correct the aberrations produced during the zooming operation. If the ratio defined in condition (3) is above the upper limit, the total length of the lens system is increased and the diameter of the frontmost lens of the front lens group is increased.

Condition (4) specifies the back focal distance. If the ratio defined in condition (4) is smaller than the lower limit, it is impossible to provide an accommodation space for the filters, etc., in front of the CCD. If the ratio defined in condition (4) is larger than the upper limit, the back focal distance is increased contrary to the need to decrease the total lens length.

If a cemented lens including a positive lens element and a negative lens element is provided in the third lens group, the sensitivity of the lens can be reduced. Specifically, in the case that the total lens length is decreased, if the positive and negative lens elements belonging to the third lens group are made of separate or independent lens elements, the power of each lens is increased. Hence the optical performance can be easily deteriorated due to a manufacturing or assembling error, such as a deviation or decentering of the lens elements from the optical axis. In other words, the lens elements become highly sensitive. To prevent this, the positive and negative lens elements in the third lens group are cemented to each other, thus resulting in a low lens sensitivity.

Conditions (5) and (6) relate to the cemented surfaces of the positive and negative lens elements of the cemented lens belonging to the third lens group. Since the third lens group has a large positive power, it is preferable that the cemented surface has a negative power to compensate the aberrations.

If the values defined in conditions (5) and (6) are smaller than the respective lower limits, the negative power of the cemented surface is too weak to compensate the spherical aberrations.

If the ratio defined in condition (6) is above the upper limit, the negative surface power is so large that high-order aberrations are produced.

The diaphragm S provided between the second lens group and the third lens group makes it possible to decrease the lens diameter of the first lens group. The diaphragm S is secured to the third lens group to move together therewith or is immovably provided between the second and third lens groups. In the latter case in which the diaphragm does not move during the zooming operation, not only can the mechanical lens barrel structure be simplified but also the weight of the third lens group can be reduced.

Focusing is carried out by the second lens group which has a large power, so that the displacement of focusing lens can be reduced. If the focusing is performed by the first lens group, the diameter of the frontmost lens is increased. Thus, it is preferable that the first lens group be immovable during the zooming or focusing operation.

Numerical embodiments of the zoom lens system of the present invention will be discussed below with reference to the following tables and the diagrams. In the following tables and drawings, $F_{NO}$ designates the F-number, f the focal length, W the half angle of view, $f_B$ the back focal distance including the glass cover (reduced distance between the last surface of the third lens group and the image pickup surface), R the radius of curvature, D the distance between the lens surfaces, Nd the refractive index at the d-line, and vd the Abbe number. In the following aberration diagrams, d-line, g-line and C-line represent the chromatic aberrations represented by spherical aberrations and lateral chromatic aberrations at the respective wavelengths, S represents the image surface of the Sagittal image, and M represents the image surface of the Meridional image.

EMBODIMENT 1

Figure 2:
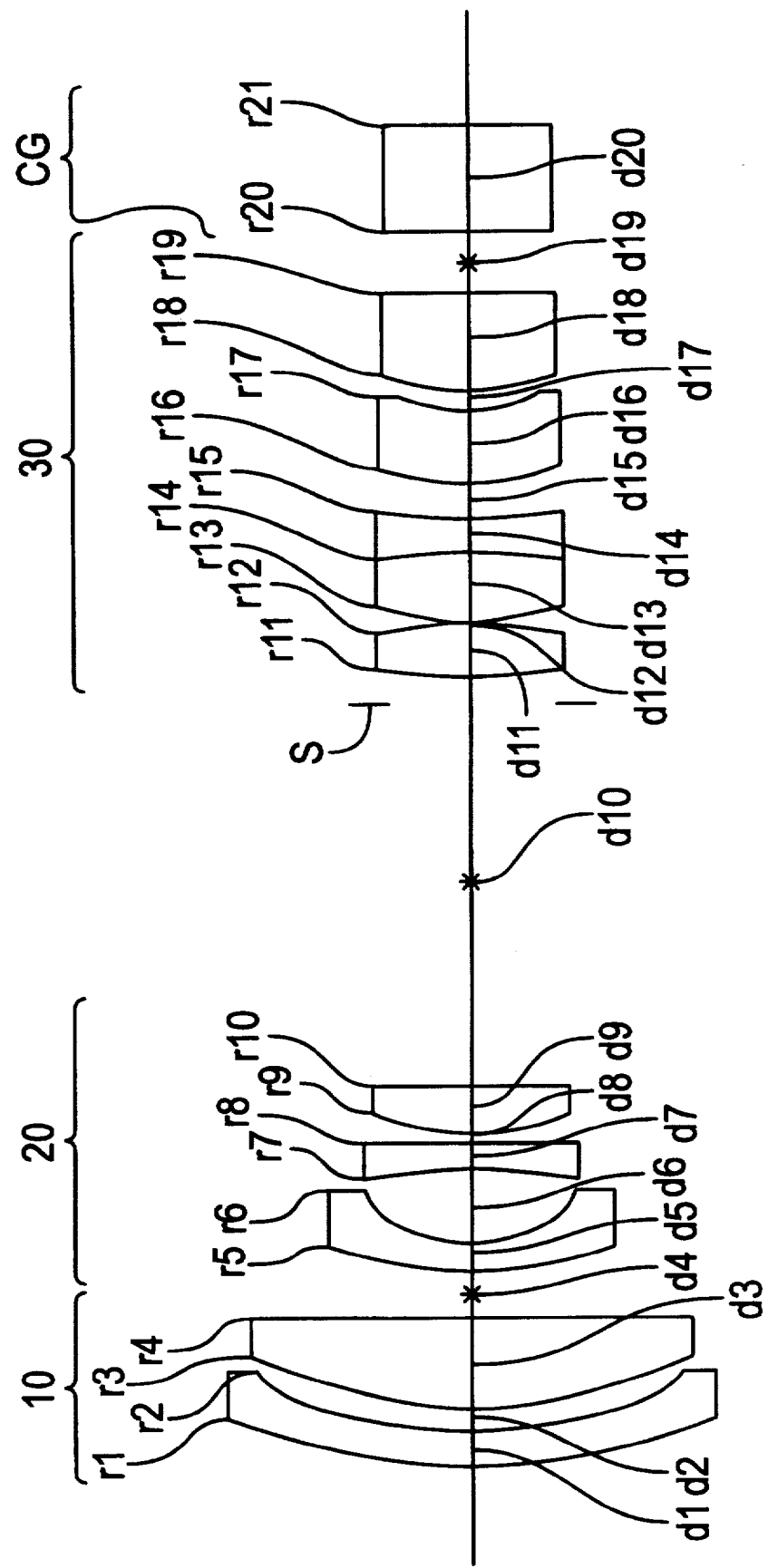
FIG. 2 is a schematic view showing the lens arrangement of a first embodiment of a zoom lens system at the shortest focal length extremity, according to the present invention.
Figure 4:
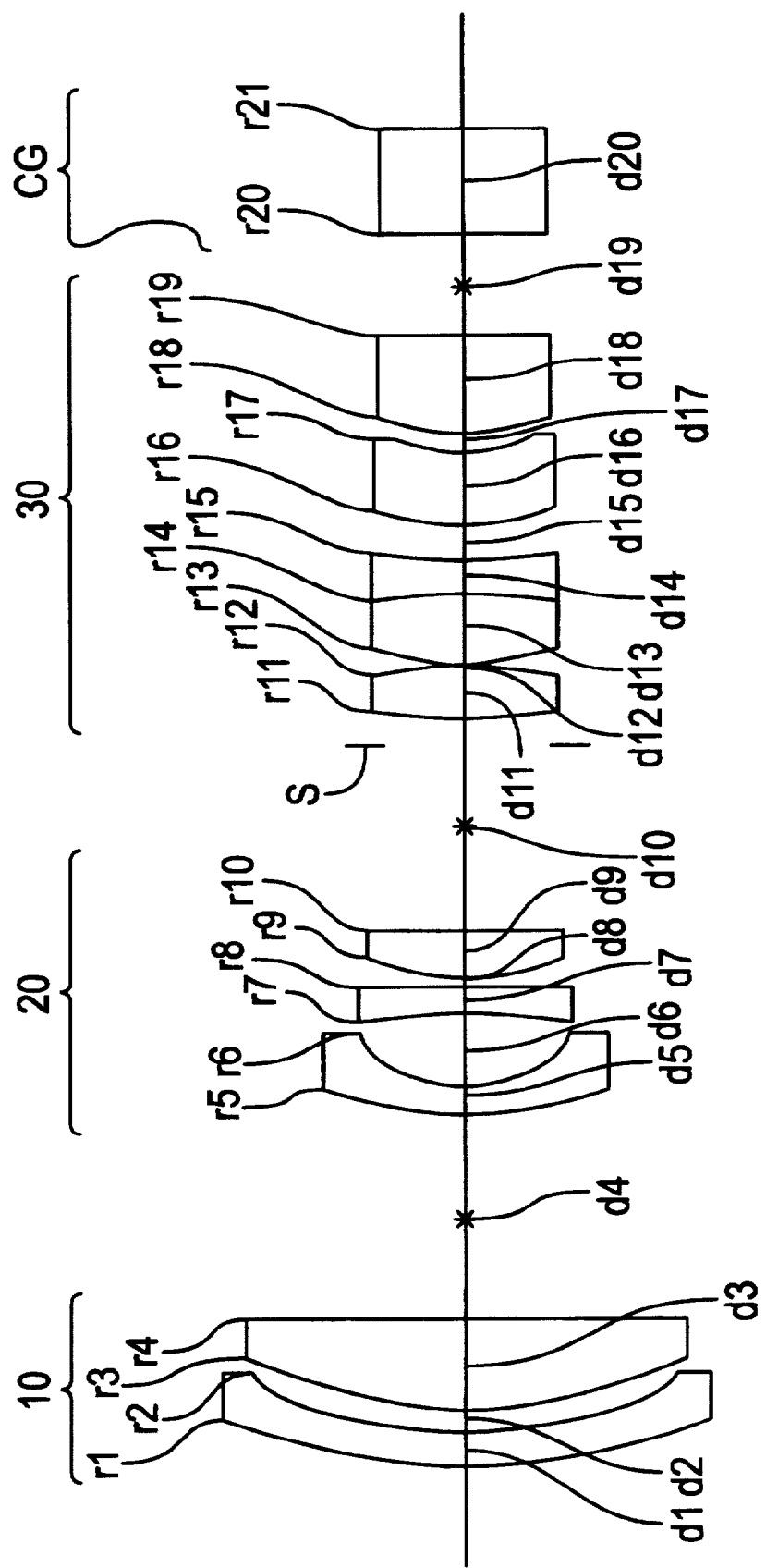
FIG. 4 is a schematic view showing the lens arrangement of the first embodiment of the zoom lens system at an intermediate focal length, according to the present invention.
Figure 5:
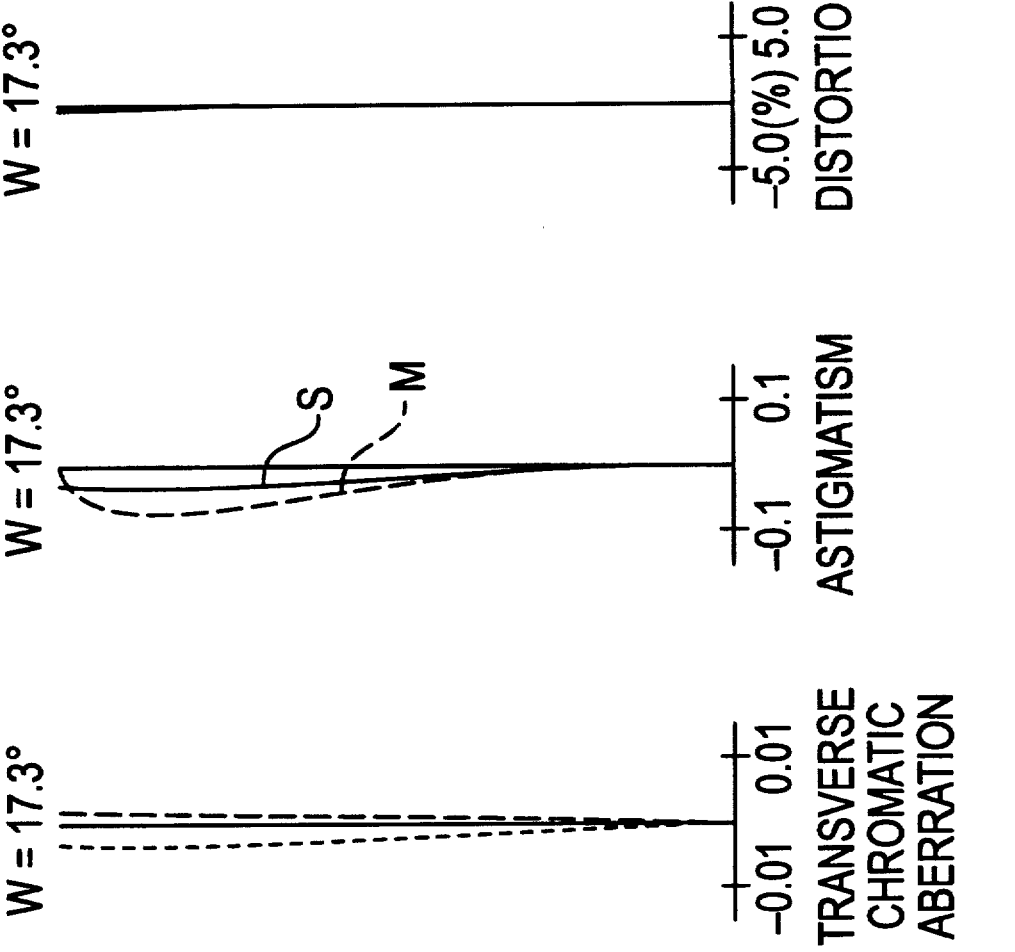
FIGS. 5A, 5B, 5C and 5D show aberration diagrams of the zoom lens system shown in FIG. 4.
Figure 6:
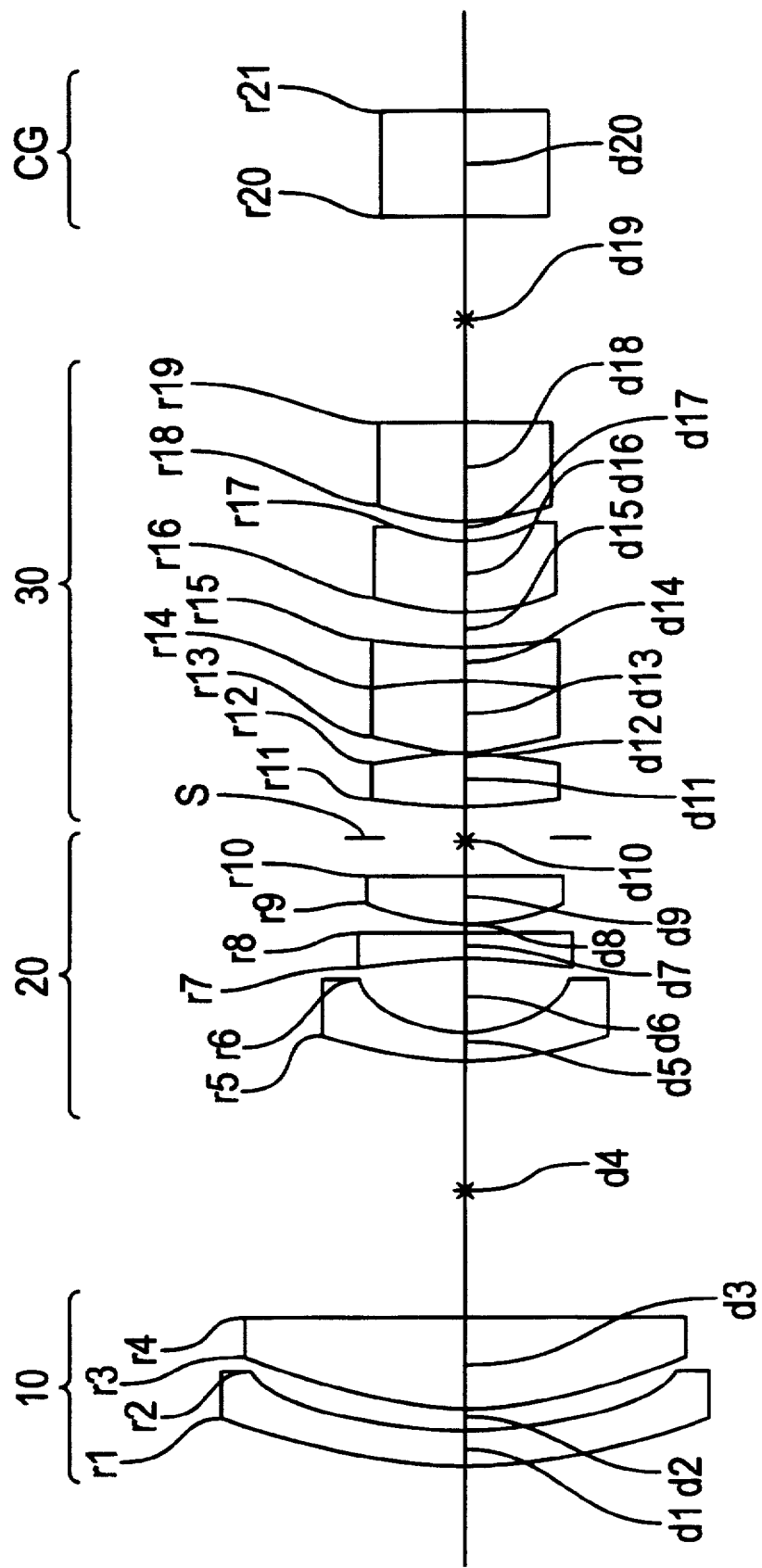
FIG. 6 is a schematic view showing the lens arrangement of the first embodiment of the zoom lens system at the longest focal length extremity, according to the present invention.
Figure 7:
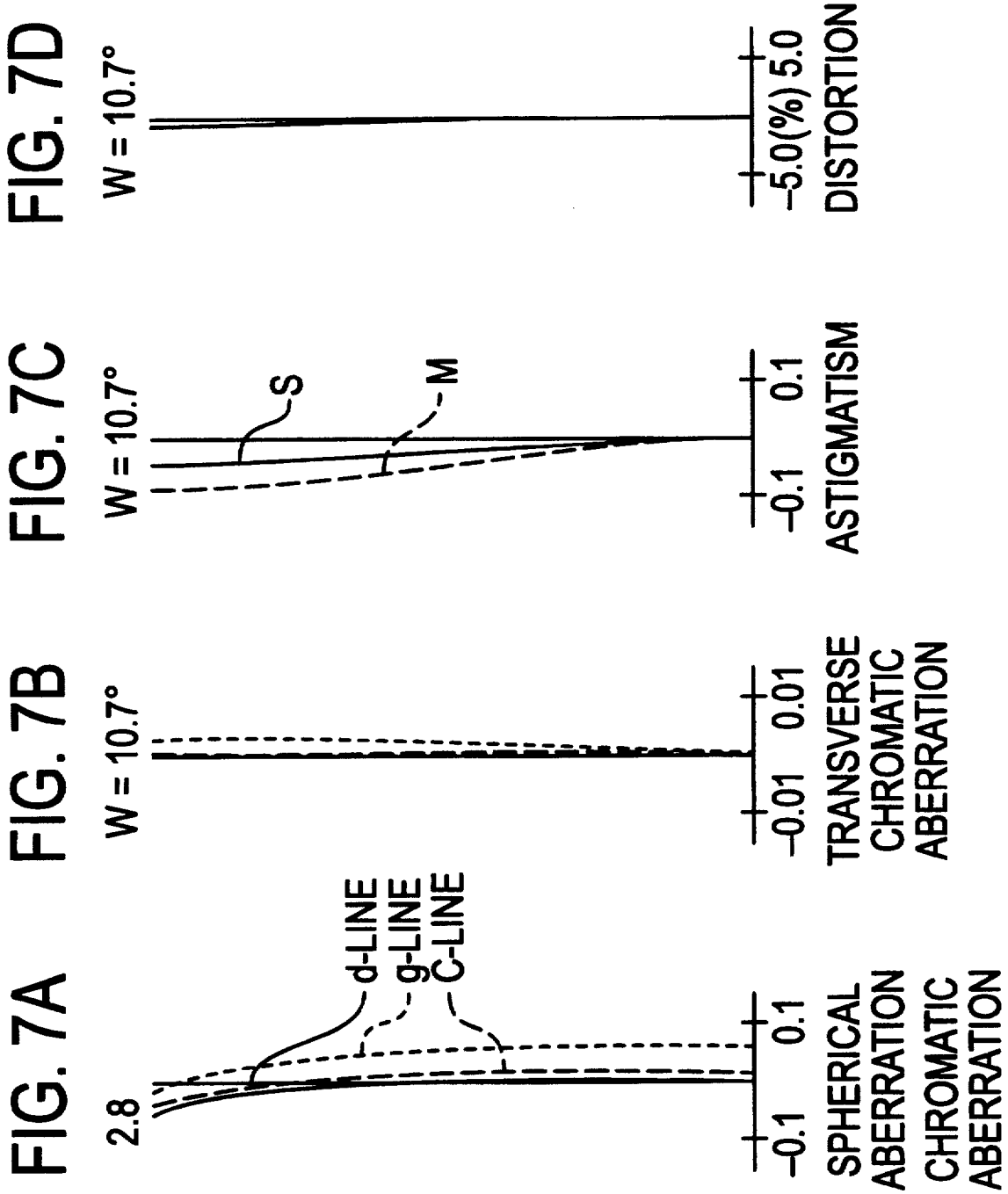
FIGS. 7A, 7B, 7C and 7D show aberration diagrams of the zoom lens system shown in FIG. 6.

FIGS. 2 through 7 show a first embodiment of the zoom lens system according to the present invention. FIGS. 2, 4 and 6 show a lens arrangement of the zoom lens system at the shortest focal length extremity, an intermediate focal length and the longest focal length extremity, respectively. In the first embodiment, the first positive lens group 10 is composed of two lens elements; the second negative lens group 20 is composed of three lens elements and the third positive lens group 30 is composed of five lens elements including a cemented lens consisting of a positive lens element and a negative lens element. The diaphragm S is located before the third lens group 30 so as to move together with the third lens group 30. The surface No. r14 refers to the cemented surface of the cemented lens belonging to the third lens group 30. The surface Nos. r20 and r21 refer to the surfaces of the glass cover CG of the CCD. FIGS. 3A, 3B, 3C and 3D, FIGS. 5A, 5B, 5C and 5D, and FIGS. 7A, 7B, 7C and 7D show aberration diagrams of the zoom lens system shown in FIGS. 2, 4 and 6, respectively.

Numerical data regarding the lens system of embodiment 1 is shown in Table 1 below.

TABLE 1

$F_{NO} = 1:2.1–2.4–2.8$
$f = 4.63–8.00–13.20$ (zoom ratio(=longest focal length of the whole lens system/shortest focal length of the whole lens system);2.85)
$W = 28.9–17.3–10.7$
$f_B = 4.06–5.66–8.34$ (=(1.89–3.49–6.17) + (3.30/1.51823))

| Surface No. | R | D | Nd | vd |
|---|---|---|---|---|
| 1 | 19.614 | 1.00 | 1.80518 | 25.4 |
| 2 | 13.652 | 0.80 | — | — |
| 3 | 15.401 | 2.64 | 1.69680 | 55.5 |
| 4 | 128.990 | 1.50–6.10–7.94 | — | — |
| 5 | 12.905 | 1.00 | 1.77250 | 49.6 |
| 6 | 4.329 | 2.14 | — | — |
| 7 | −16.464 | 0.90 | 1.77250 | 49.6 |
| 8 | 22.618 | 0.19 | — | — |
| 9 | 9.504 | 1.47 | 1.84666 | 23.8 |
| 10 | 32.729 | 11.89–5.69–1.17 | — | — |
| diaphragm | ∞ | 0.85 | — | — |
| 11 | 28.017 | 1.56 | 1.80400 | 46.6 |
| 12 | −21.797 | 0.10 | — | — |
| 13 | 7.476 | 2.32 | 1.67790 | 55.3 |
| 14 | −20.492 | 1.00 | 1.84666 | 23.8 |
| 15 | 15.606 | 1.14 | — | — |
| 16 | 7.940 | 2.00 | 1.80518 | 25.4 |
| 17 | 4.059 | 0.81 | — | — |
| 18 | 6.678 | 3.00 | 1.77250 | 49.6 |
| 19 | 1804.500 | 1.89–3.49–6.17 | — | — |
| 20 | ∞ | 3.30 | 1.51823 | 59.0 |
| 21 | ∞ | — | — | — |

EMBODIMENT 2

Figure 8:
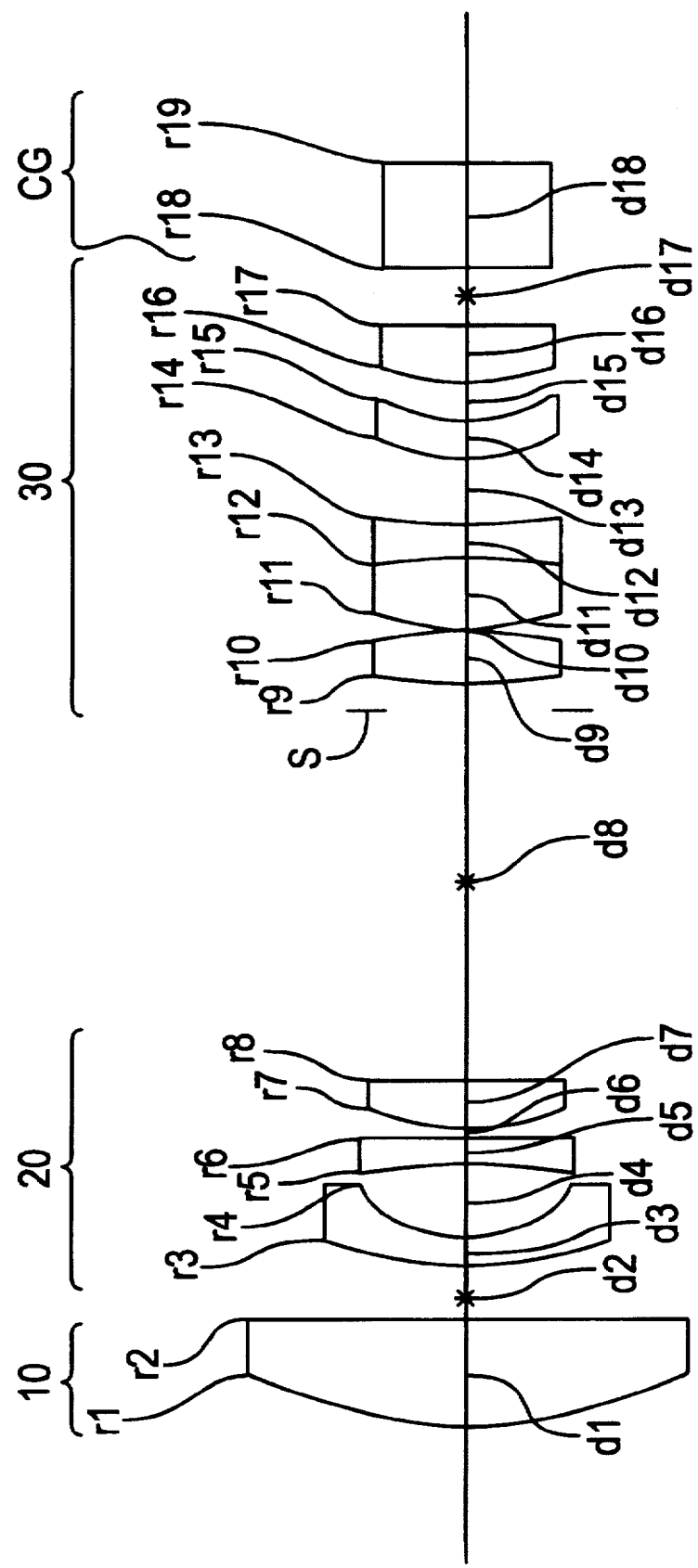
FIG. 8 is a schematic view showing the lens arrangement of a second embodiment of a zoom lens system at the shortest focal length extremity, according to the present invention.
Figure 9:
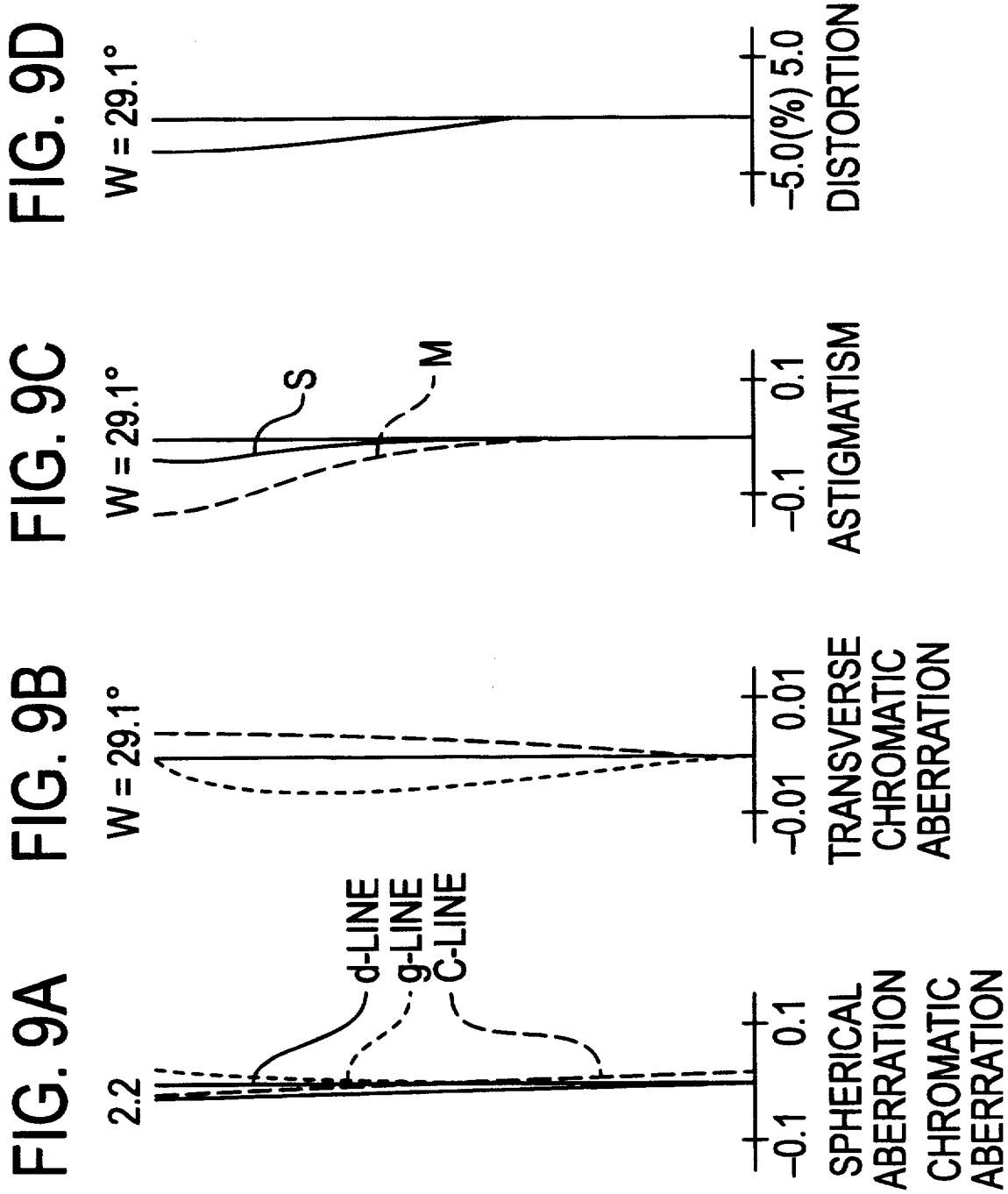
FIGS. 9A, 9B, 9C and 9D show aberration diagrams of the zoom lens system shown in FIG. 8.
Figure 10:
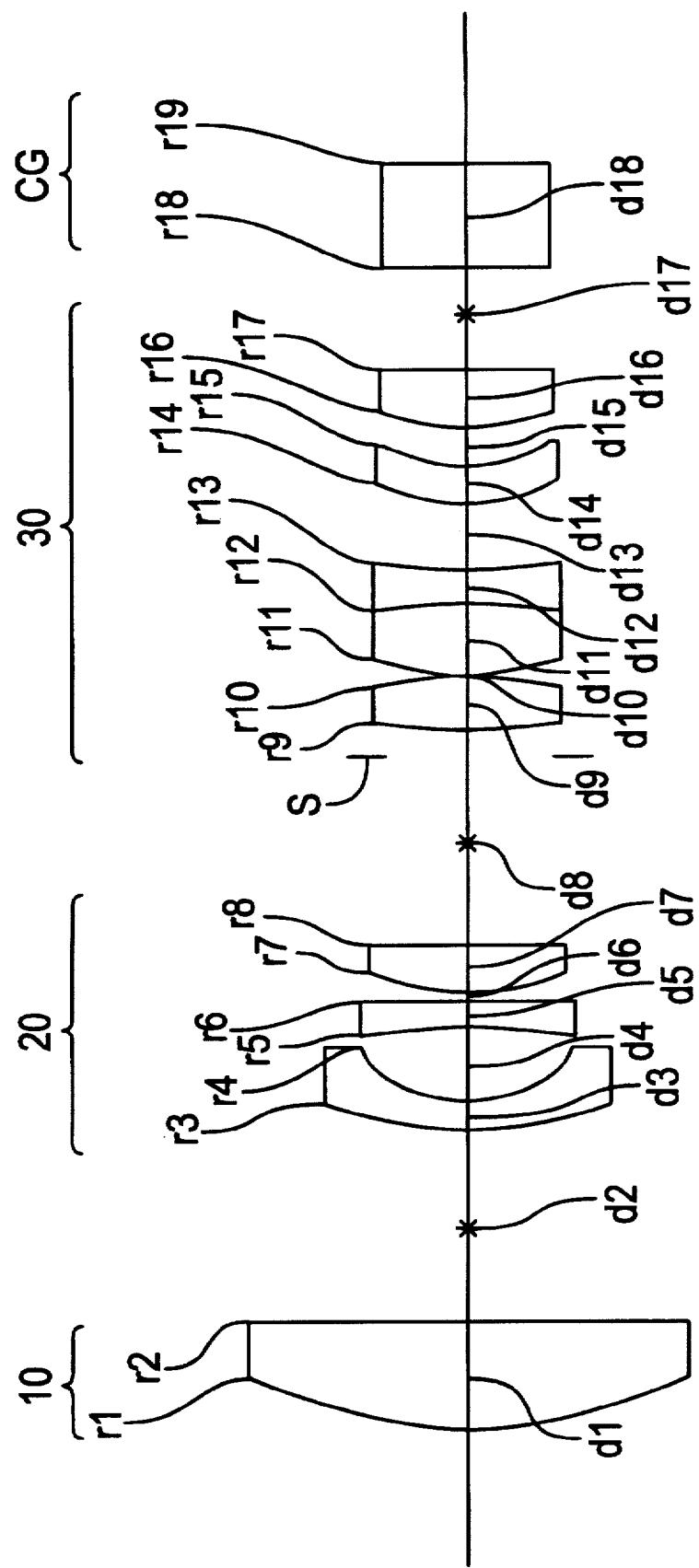
FIG. 10 is a schematic view showing the lens arrangement of e second embodiment of the zoom lens system at an intermediate focal length, according to the present invention.
Figure 11:
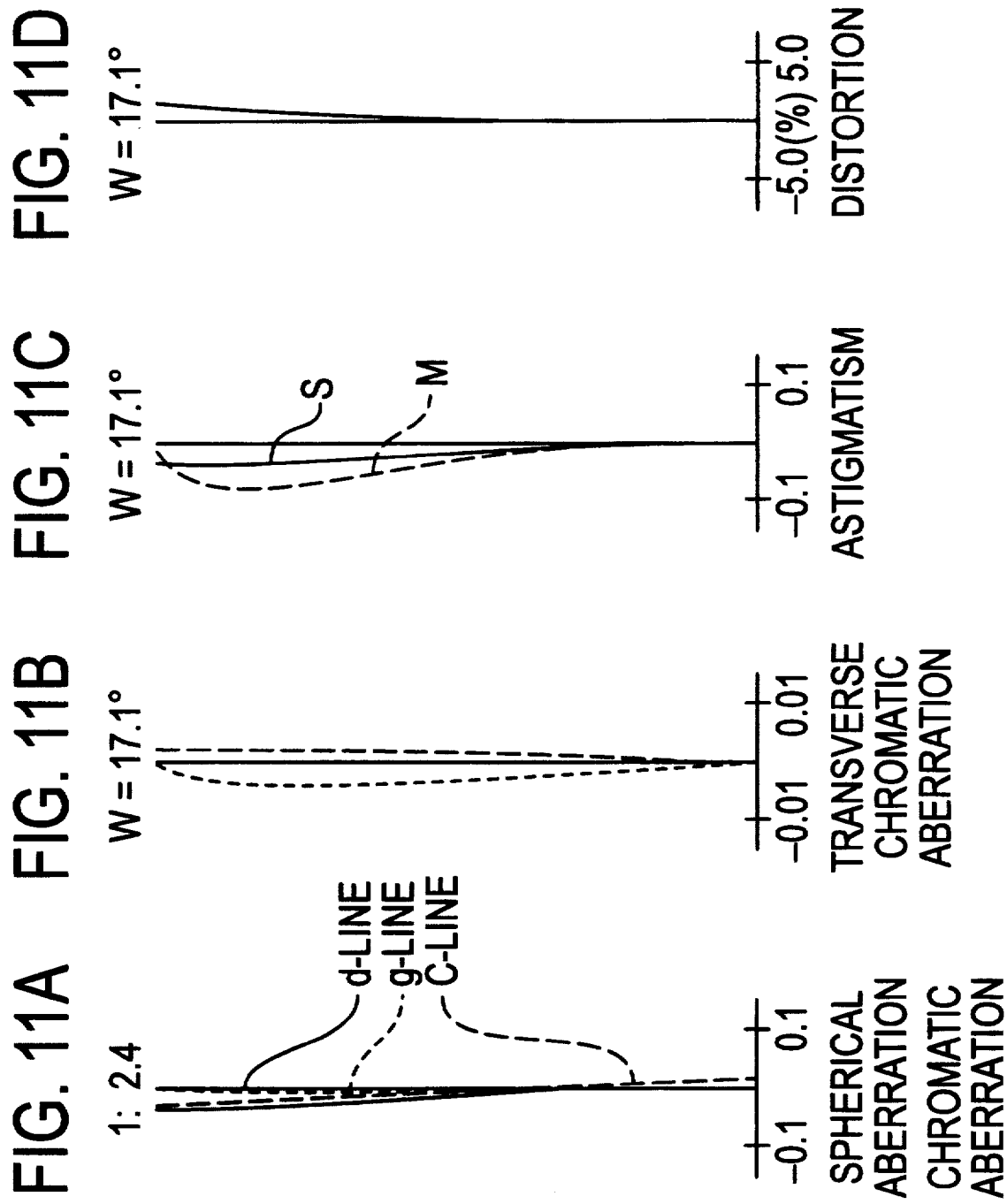
FIGS. 11A, 11B, 11C and 11D show aberration diagrams of the zoom lens system shown in FIG. 10.
Figure 12:
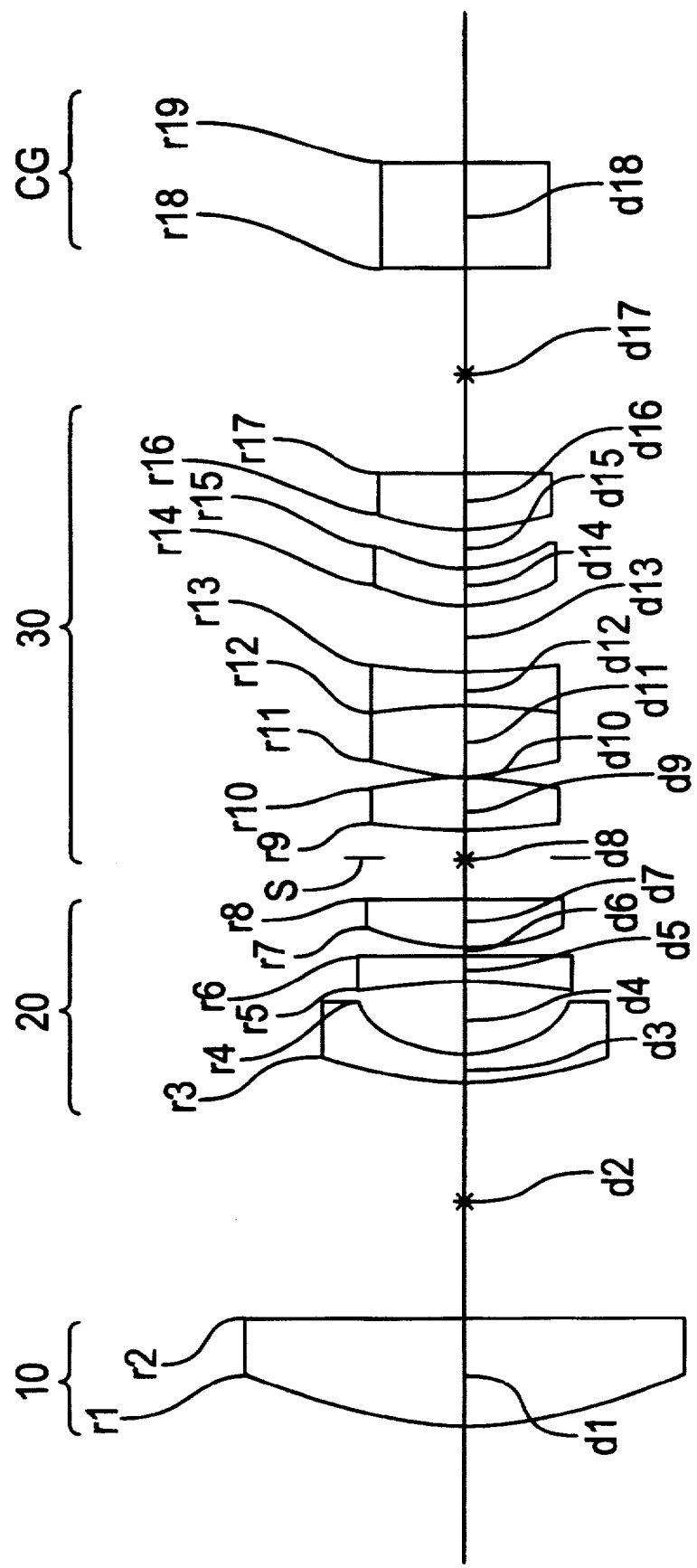
FIG. 12 is a schematic view showing the lens arrangement of the second embodiment of the zoom lens system at the longest focal length extremity, according to the present invention.
Figure 13:
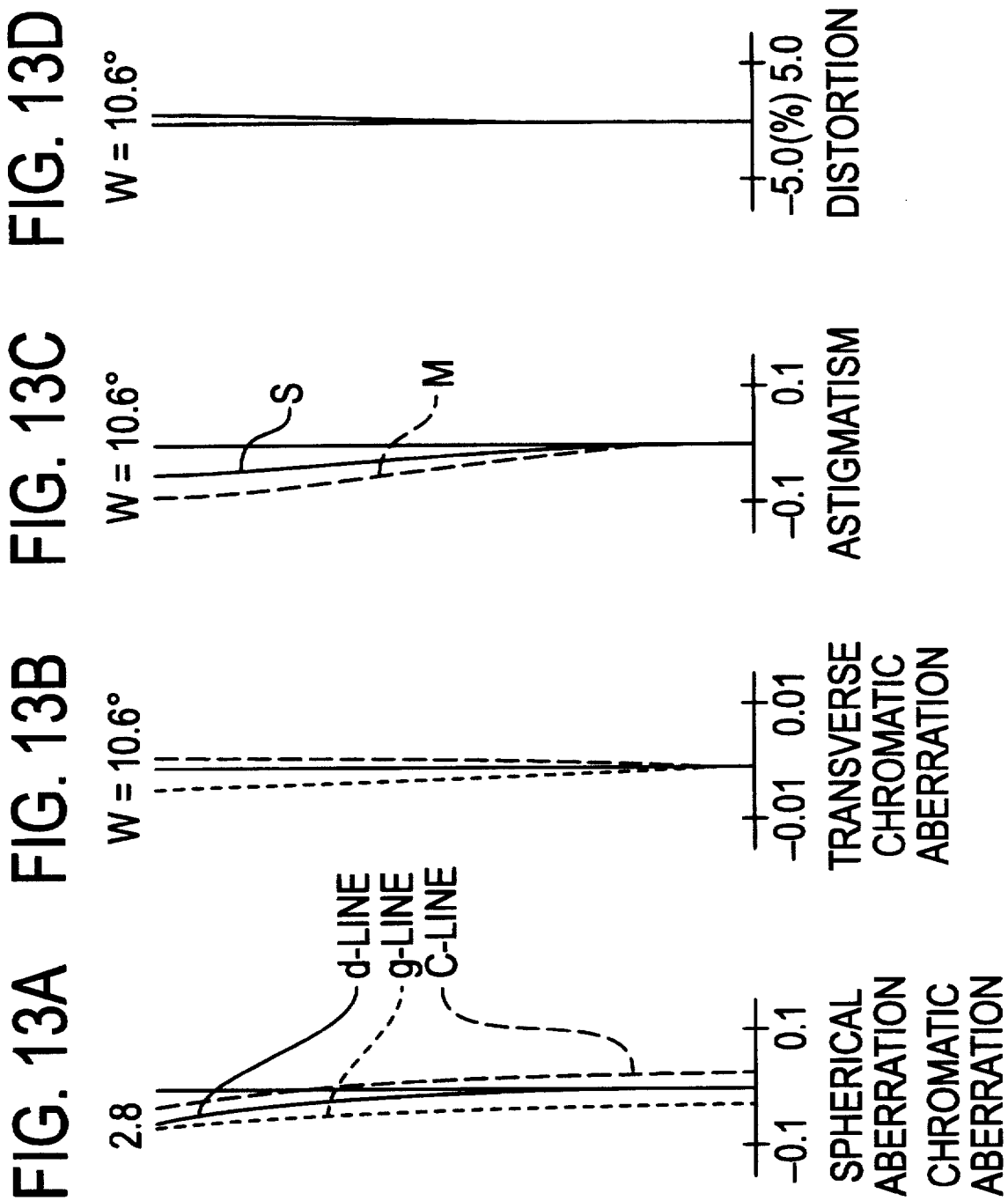
FIGS. 13A, 13B, 13C and 13D show aberration diagrams of the zoom lens system shown in FIG. 12.

FIGS. 8 through 13 show a second embodiment of a zoom lens, according to the present invention. FIGS. 8, 10 and 12 show a lens arrangement thereof at the shortest focal length extremity, an intermediate focal length, and the longest focal length extremity, respectively. In the second embodiment, the first positive lens group 10 is composed of a single lens element; the second negative lens group 20 is composed of three lens elements; and the third positive lens group 30 is composed of five lens elements including a cemented lens consisting of a positive lens element and a negative lens element. The diaphragm S is located before the third lens group 30 so as to move together with the third lens group. The surface No. r12 refers to the cemented surface of the cemented lens belonging to the third lens group. The surface Nos. r18 and r19 refer to the surfaces of the glass cover CG of the CCD. FIGS. 9A, 9B, 9C and 9D, FIGS. 11A, 11B, 11C and 11D and FIGS. 13A, 13B, 13C and 13D show aberration diagrams of the zoom lens system shown in FIGS. 8, 10 and 12, respectively.

Numerical data regarding the lens system of embodiment 2 is shown in Table 2 below.

TABLE 2

$F_{NO}$ = 1:2.2–2.4–2.8
f = 4.61–8.00–13.20 (zoom ratio;2.86)
W = 29.1–17.1–10.6
$f_B$ = 4.00–5.77–8.79 (=(1.83–3.60–6.62) + (3.30/1.51823))

| Surface No. | R | D | Nd | vd |
|---|---|---|---|---|
| 1 | 18.895 | 3.36 | 1.48749 | 70.2 |
| 2 | −8144.253 | 1.62–6.03–7.66 | — | — |
| 3 | 14.322 | 1.00 | 1.80400 | 46.6 |
| 4 | 4.263 | 2.41 | — | — |
| 5 | −11.917 | 0.90 | 1.77250 | 49.6 |
| 6 | 60.106 | 0.10 | — | — |
| 7 | 10.454 | 1.85 | 1.84666 | 23.8 |
| 8 | 43.237 | 11.99–5.81–1.16 | — | — |
| diaphragm | ∞ | 0.84 | — | — |
| 9 | 23.595 | 1.64 | 1.80400 | 46.6 |
| 10 | −17.139 | 0.10 | — | — |
| 11 | 6.845 | 2.38 | 1.58913 | 61.2 |
| 12 | −12.857 | 1.00 | 1.84666 | 23.8 |
| 13 | 16.348 | 2.38 | — | — |
| 14 | 7.081 | 1.00 | 1.80518 | 25.4 |
| 15 | 4.112 | 1.33 | — | — |
| 16 | 6.926 | 1.97 | 1.71736 | 29.5 |
| 17 | 5026.014 | 1.83–3.60–6.62 | — | — |
| 18 | ∞ | 3.30 | 1.51823 | 59.0 |
| 19 | ∞ | — | — | — |

EMBODIMENT 3

Figure 14:
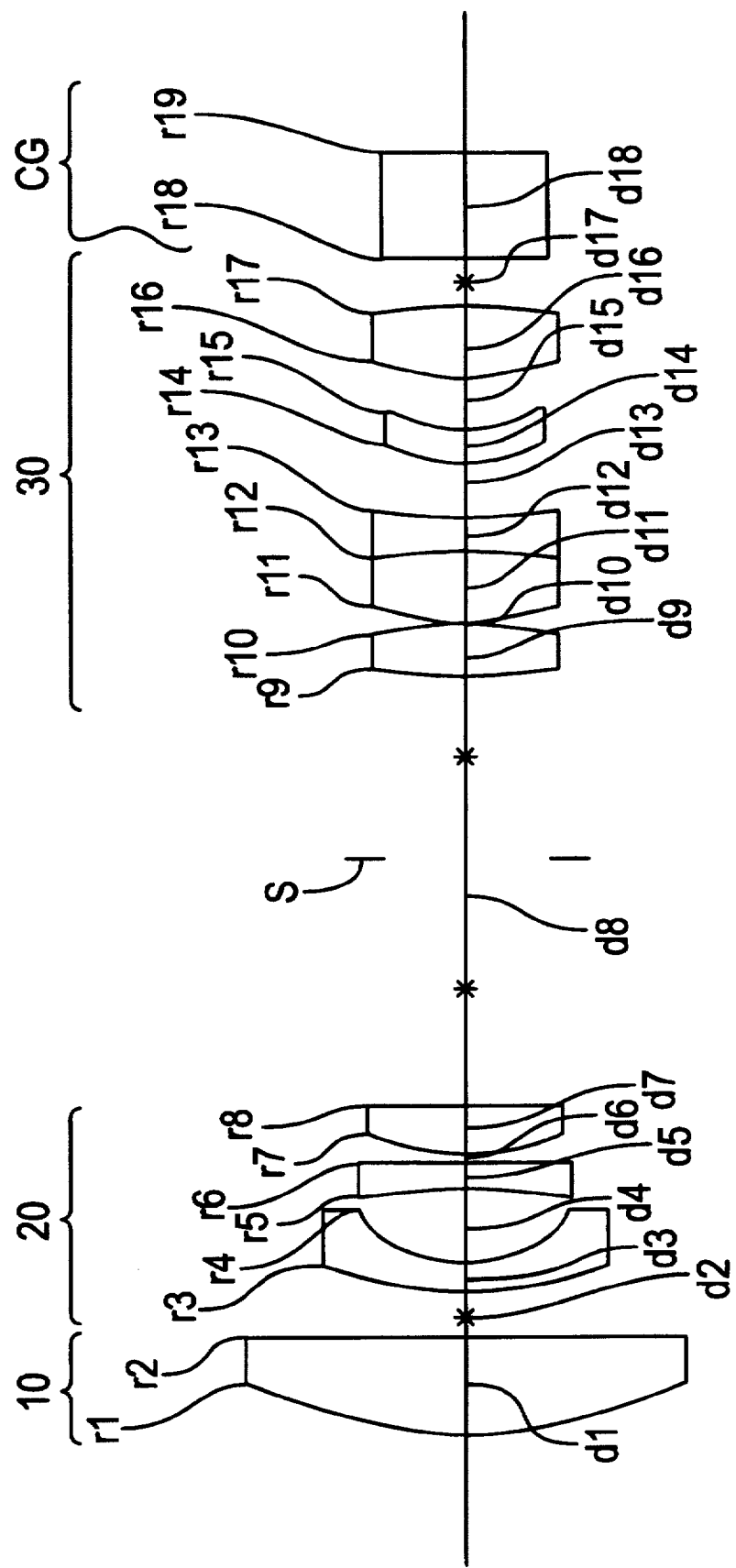
FIG. 14 is a schematic view showing the lens arrangement of a third embodiment of a zoom lens system at the shortest focal length extremity, according to the present invention.
Figure 15:
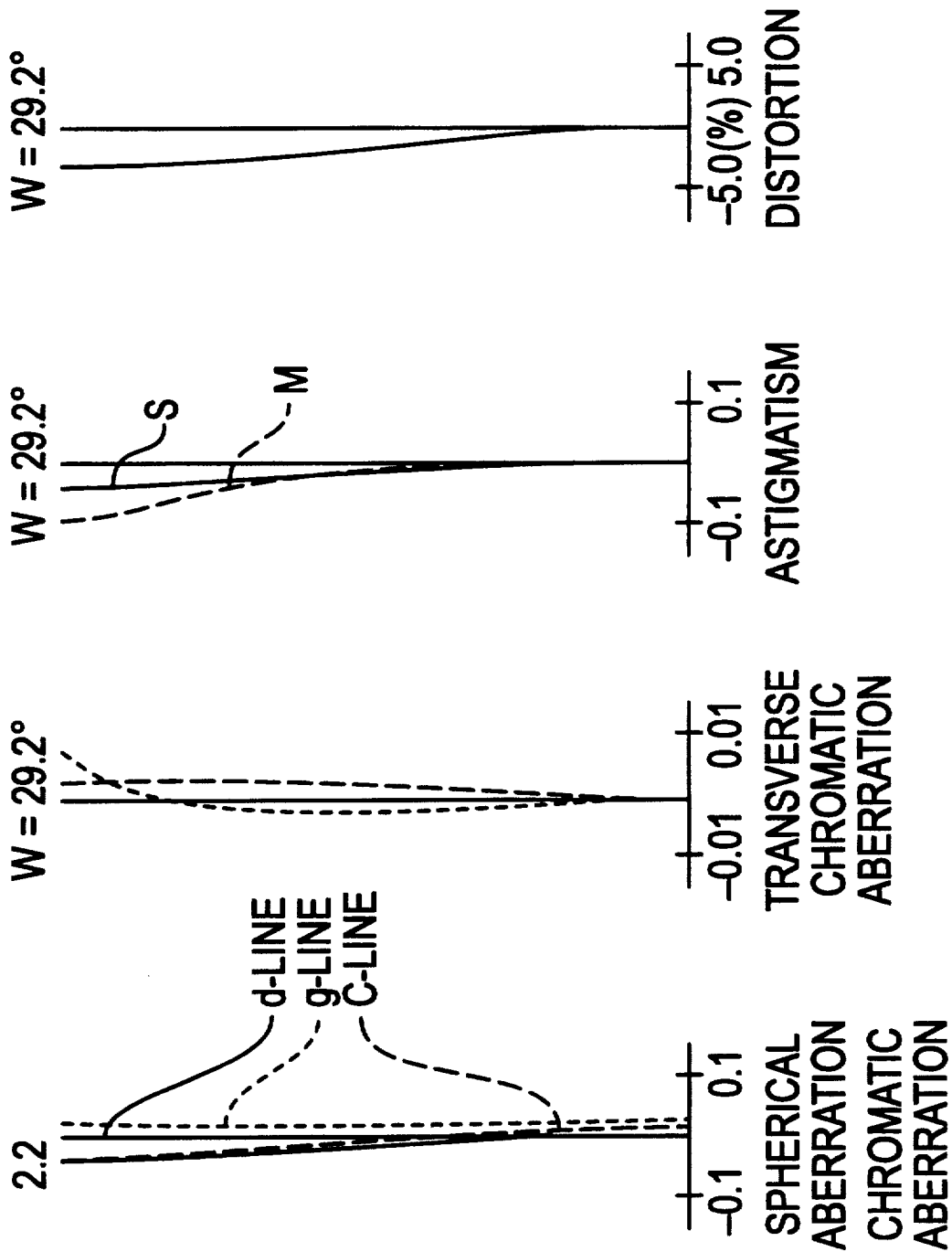
FIGS. 15A, 15B, 15C and 15D show aberration diagrams of the zoom lens system shown in FIG. 14.
Figure 16:
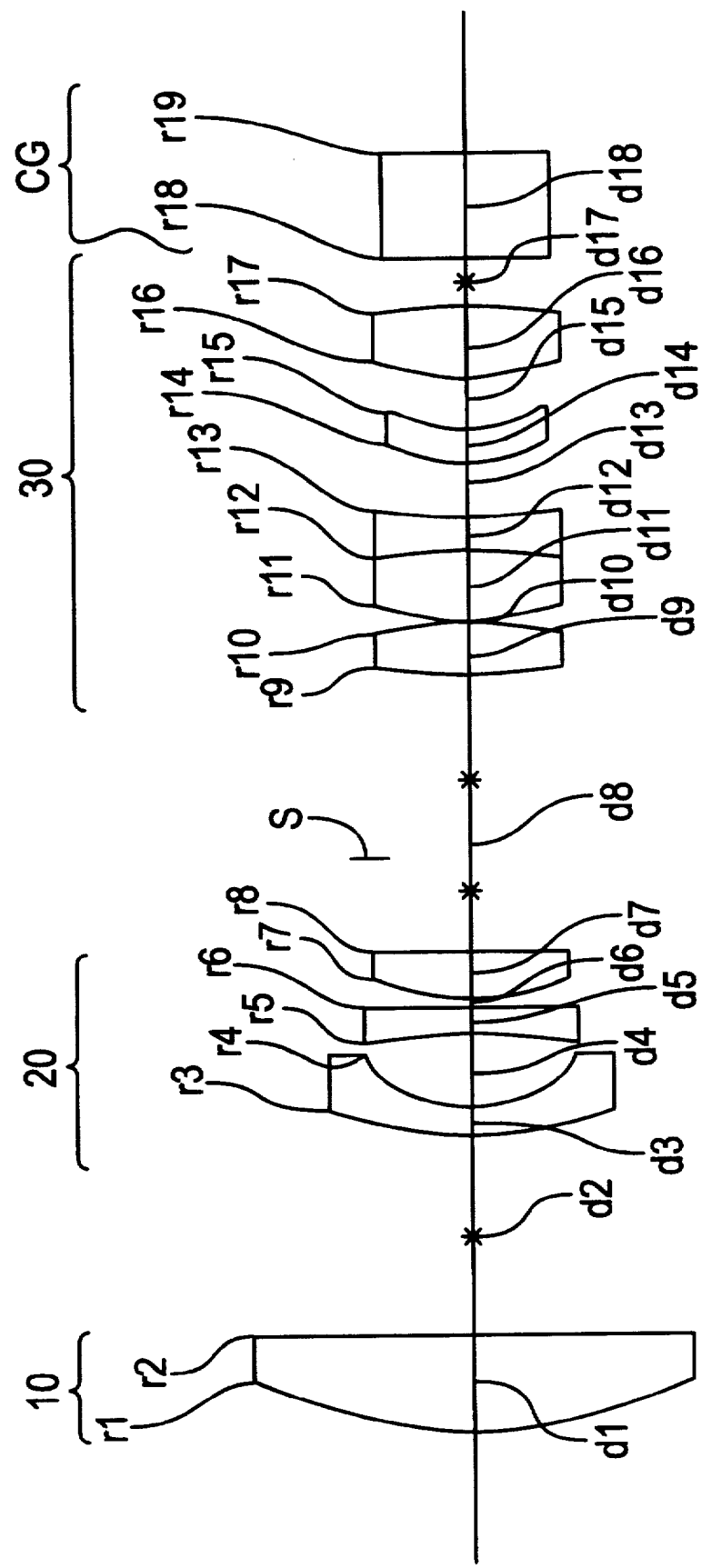
FIG. 16 is a schematic view showing the lens arrangement of the third embodiment of the zoom lens system at an intermediate focal length, according to the present invention.
Figure 17:
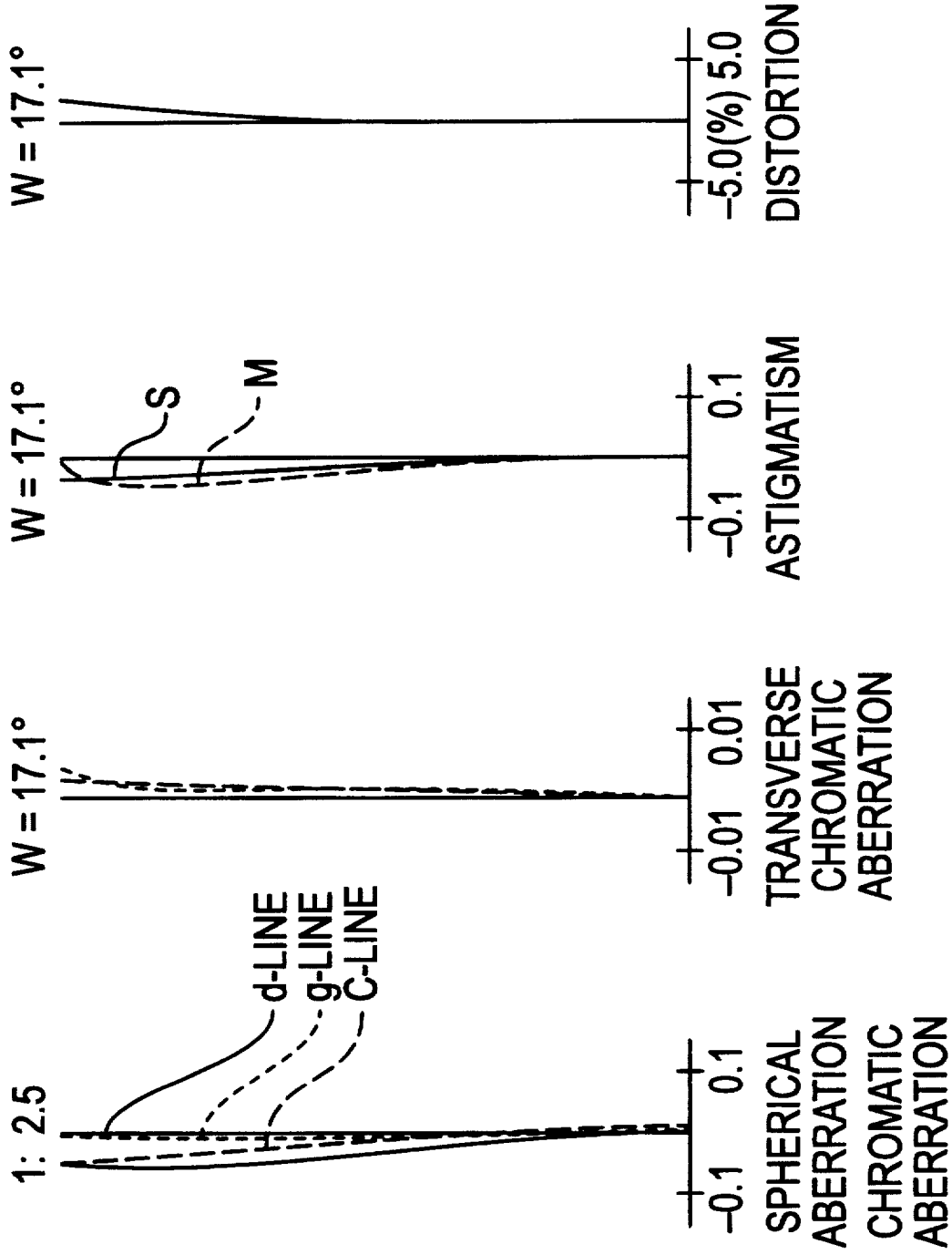
FIGS. 17A, 17B, 17C and 17D show aberration diagrams of the zoom lens system shown in FIG. 16.
Figure 18:
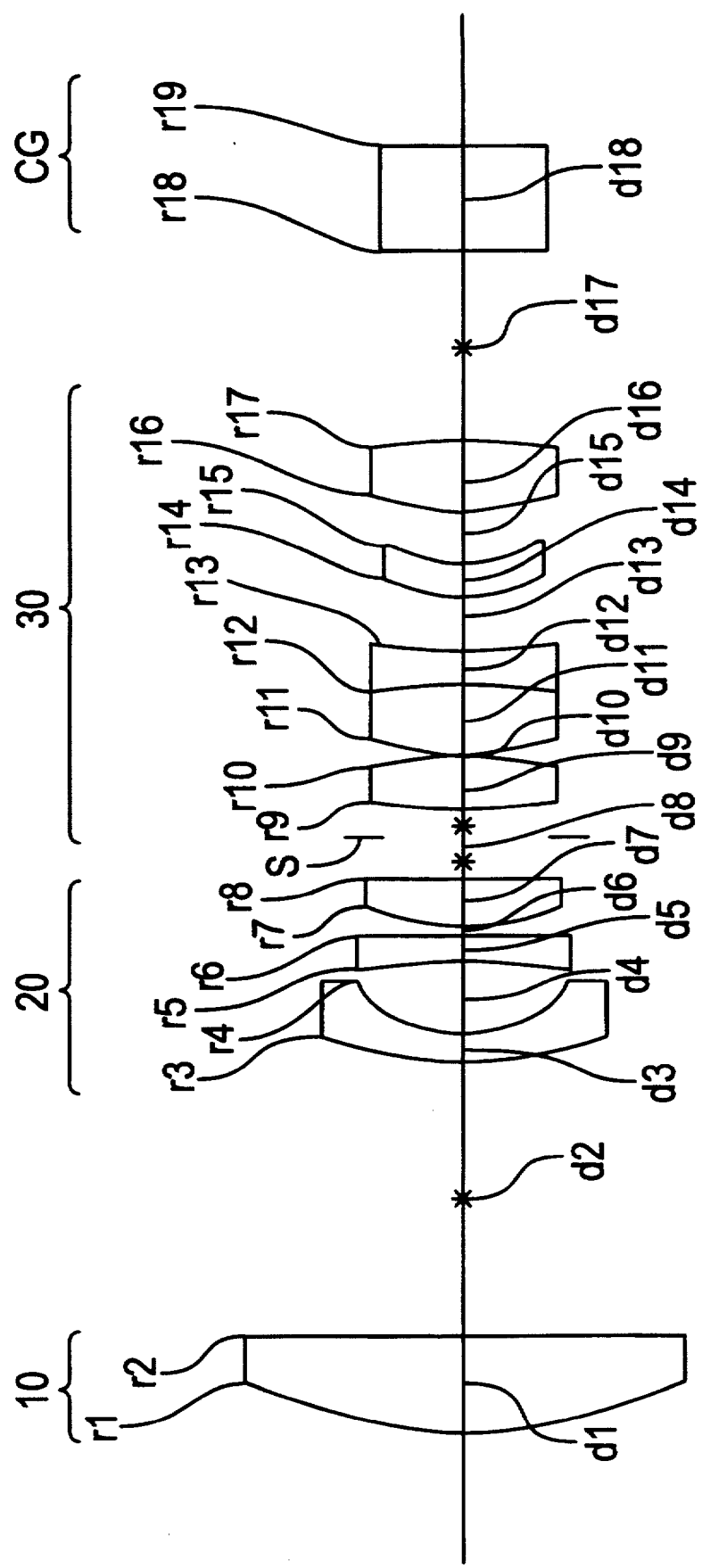
FIG. 18 a schematic view showing the lens arrangement of the third embodiment of the zoom lens system at the longest focal length extremity, according to the present invention.
Figure 19:
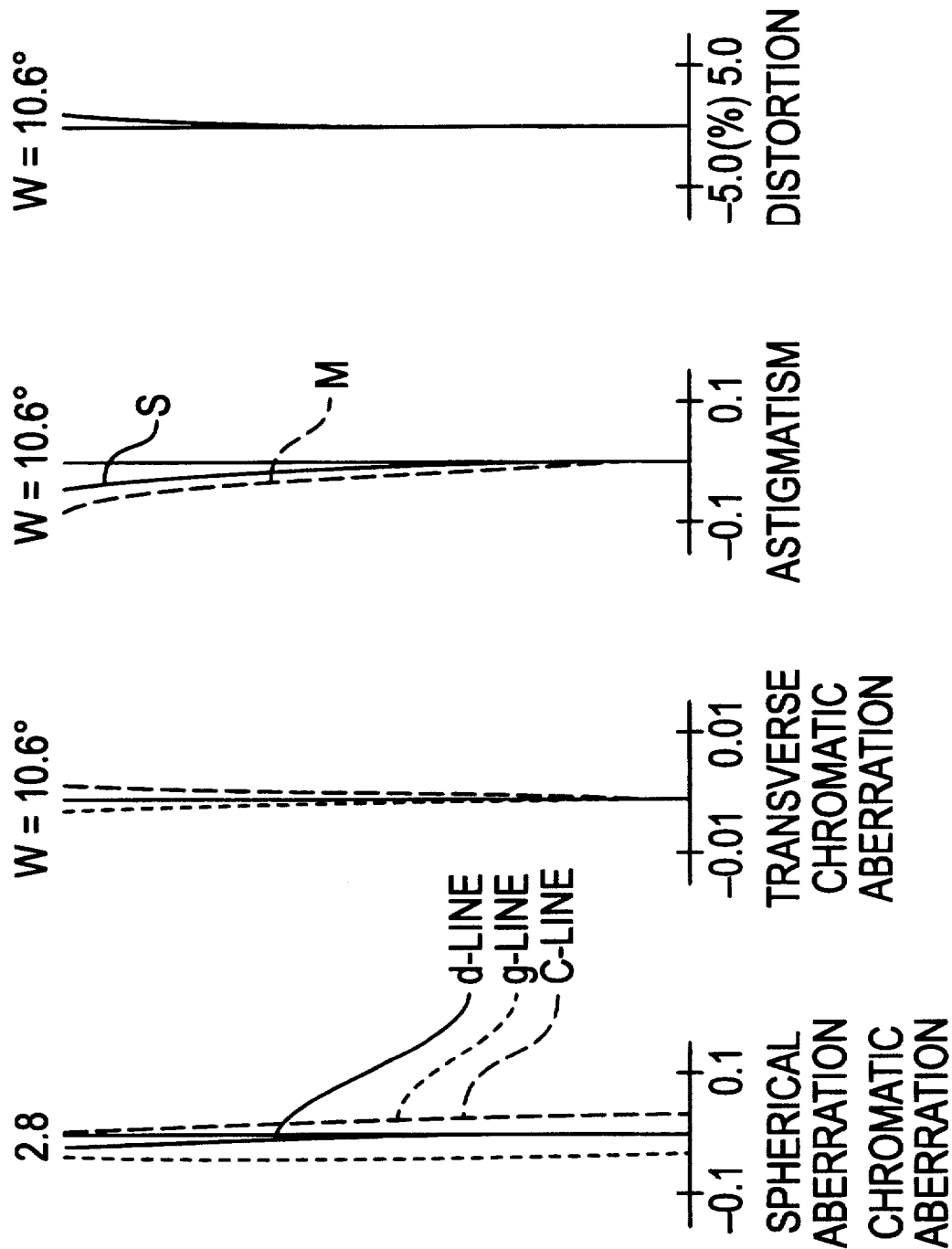
FIGS. 19A, 19B, 19C and 19D show aberration diagrams of the zoom lens system shown in FIG. 18.

FIGS. 14 through 19 show a third embodiment of a zoom lens system according to the present invention. FIGS. 14, 16 and 18 show a lens arrangement thereof at the shortest focal length extremity, an intermediate focal length, and the longest focal length extremity, respectively. In the third embodiment, the first positive lens group 10 is composed of a single lens element; the second negative lens group 20 is composed of three lens elements; and the third positive lens group 30 is composed of five lens elements including a cemented lens consisting of a positive lens element and a negative lens element. The diaphragm S is immovably located between the second and third lens groups. The surface No. r12 refers to the cemented surface of the cemented lens belonging to the third lens group. The surface Nos. r18 and r19 refer to the surfaces of the glass cover CG of the CCD. FIGS. 15A, 15B, 15C and 15D, FIGS. 17A, 17B, 17C and 17D and FIGS. 19A, 19B, 19C and 19D show aberration diagrams of the zoom lens system shown in FIGS. 14, 16 and 18, respectively.

Numerical data regarding the lens system of embodiment 3 is shown in Table 3 below.

TABLE 3

$F_{NO}$ = 1:2.2–2.5–2.8
f = 4.61–8.00–13.20 (zoom ratio;2.86)
W = 29.2–17.1–10.6
$f_B$ = 3.86–5.49–8.12(=(1.79–3.42–6.05) + (3.14/1.51633))

| Surface No. | R | D | Nd | vd |
|---|---|---|---|---|
| 1 | 16.761 | 2.90 | 1.48749 | 70.2 |
| 2 | 295.051 | 1.40–6.05–8.25 | — | — |
| 3 | 14.358 | 1.00 | 1.80400 | 46.6 |
| 4 | 4.188 | 2.29 | — | — |
| 5 | −12.760 | 0.90 | 1.77250 | 49.6 |
| 6 | 36.751 | 0.10 | — | — |
| 7 | 10.145 | 1.56 | 1.84666 | 23.8 |
| 8 | 58.464 | 8.05–3.40–1.20 | — | — |
| diaphragm | ∞ | 5.05–3.42–0.79 | — | — |
| 9 | 24.576 | 1.67 | 1.80400 | 46.6 |
| 10 | −14.819 | 0.10 | — | — |

TABLE 3-continued $F_{NO}$ = 1:2.2–2.5–2.8
f = 4.61–8.00–13.20 (zoom ratio;2.86)
W = 29.2–17.1–10.6
$f_B$ = 3.86–5.49–8.12(=(1.79–3.42–6.05) + (3.14/1.51633))

| Surface No. | R | D | Nd | vd |
|---|---|---|---|---|
| 11 | 6.274 | 2.81 | 1.58913 | 61.2 |
| 12 | −10.537 | 1.00 | 1.84666 | 23.8 |
| 13 | 13.556 | 1.39 | — | — |
| 14 | 8.821 | 1.00 | 1.80518 | 25.4 |
| 15 | 4.205 | 1.75 | — | — |
| 16 | 8.187 | 2.04 | 1.71736 | 29.5 |
| 17 | −21.665 | 1.79–3.42–6.05 | — | — |
| 18 | ∞ | 3.14 | 1.51633 | 64.1 |
| 19 | ∞ | — | — | — |

EMBODIMENT 4

Figure 20:
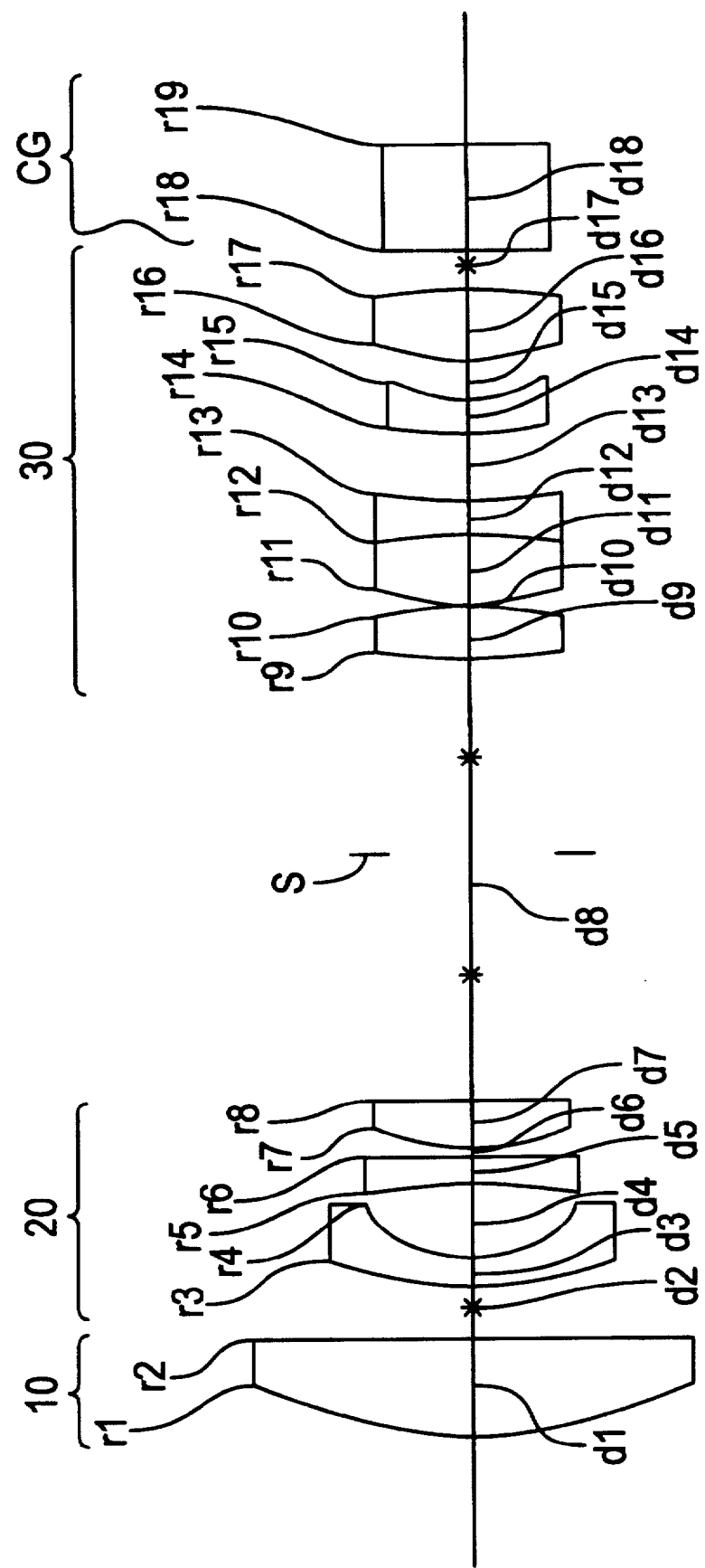
FIG. 20 is a schematic view showing the lens arrangement of a fourth embodiment of a zoom lens system at the shortest focal length extremity, according to the present invention.
Figure 21:
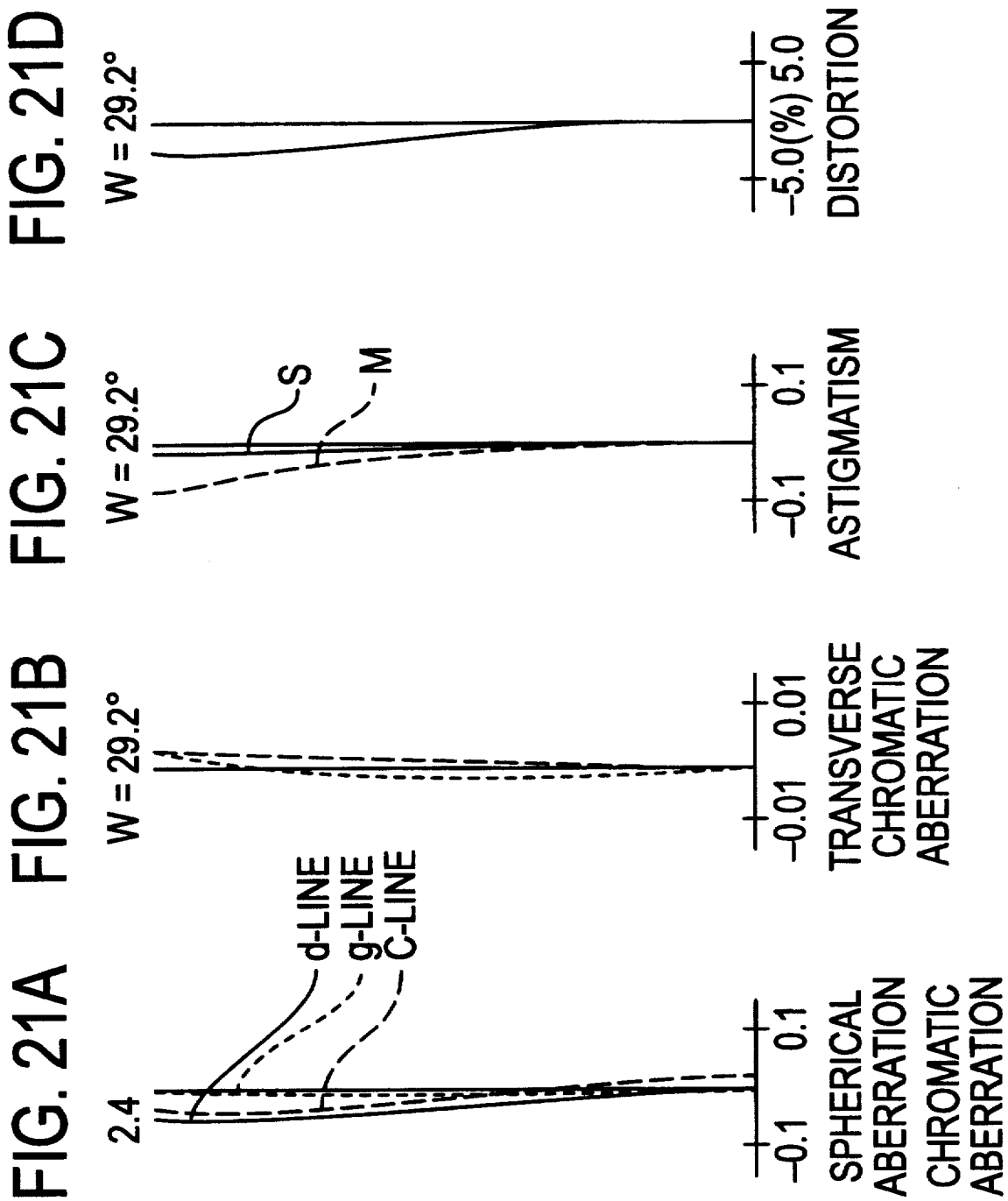
FIGS. 21A, 21B, 21C and 21D show aberration diagrams of the zoom lens system shown in FIG. 20.
Figure 22:
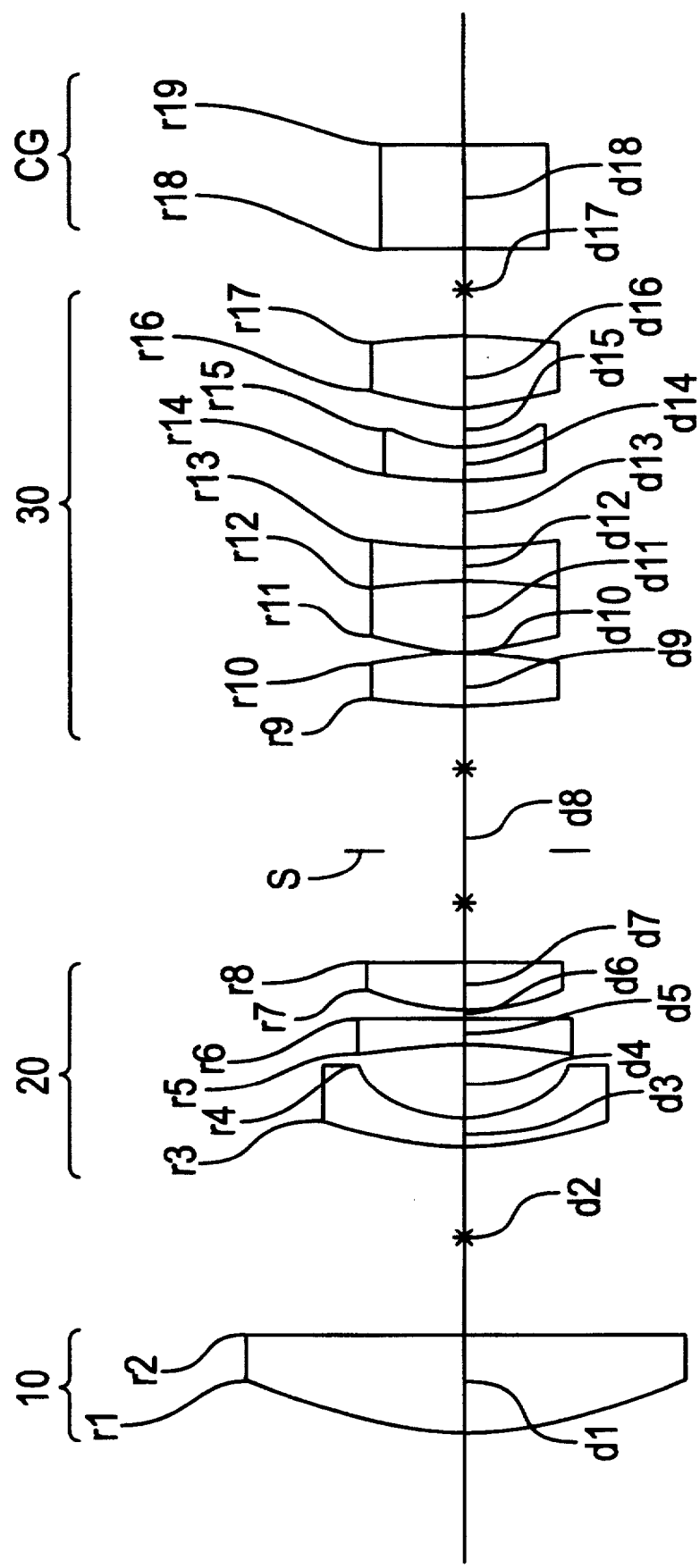
FIG. 22 is a schematic view showing the lens arrangement of the fourth embodiment of the zoom lens system at an intermediate focal length, according to the present invention.
Figure 23:
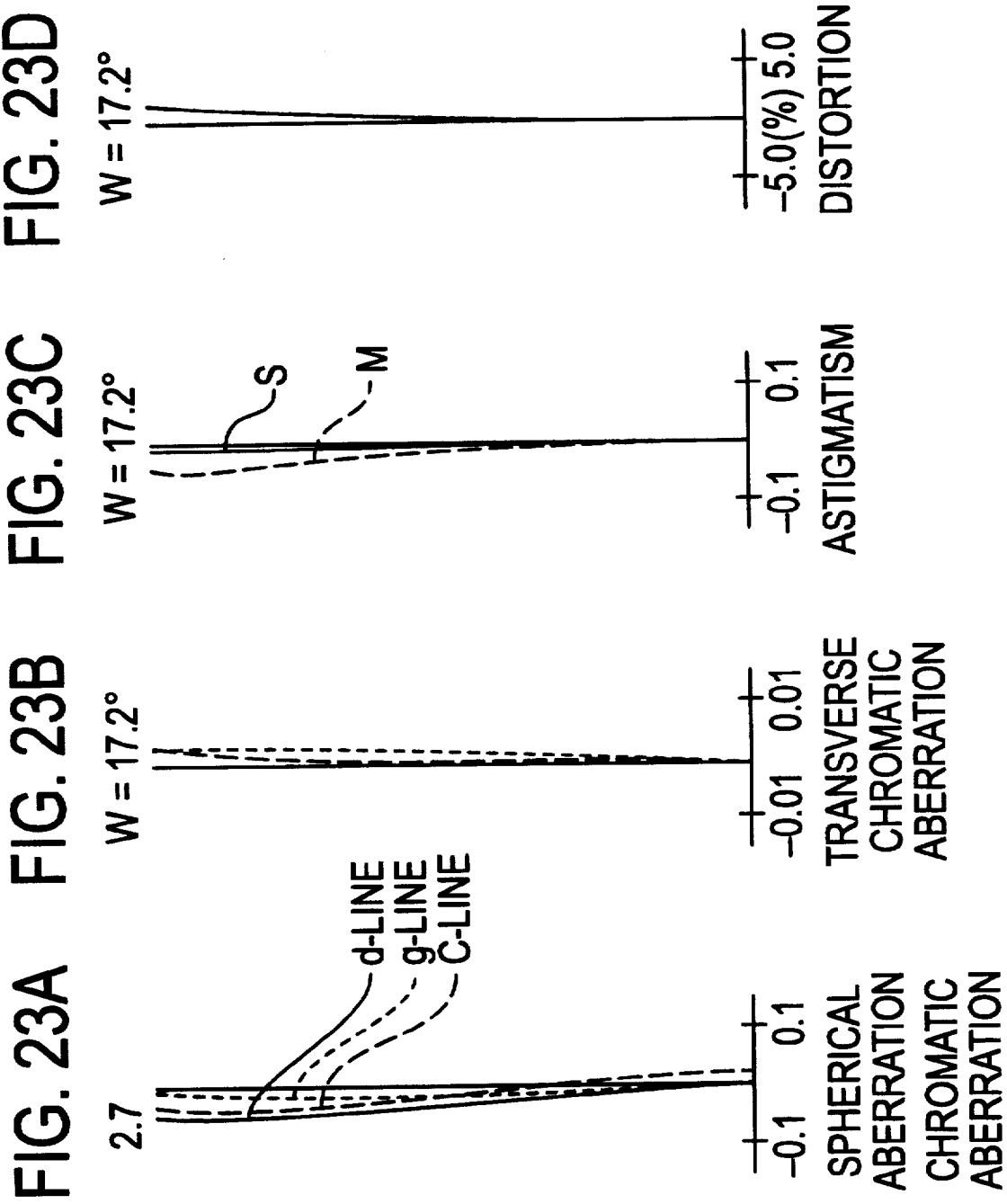
FIGS. 23A, 23B, 23C and 23D show aberration diagrams of the zoom lens system shown in FIG. 22.
Figure 24:
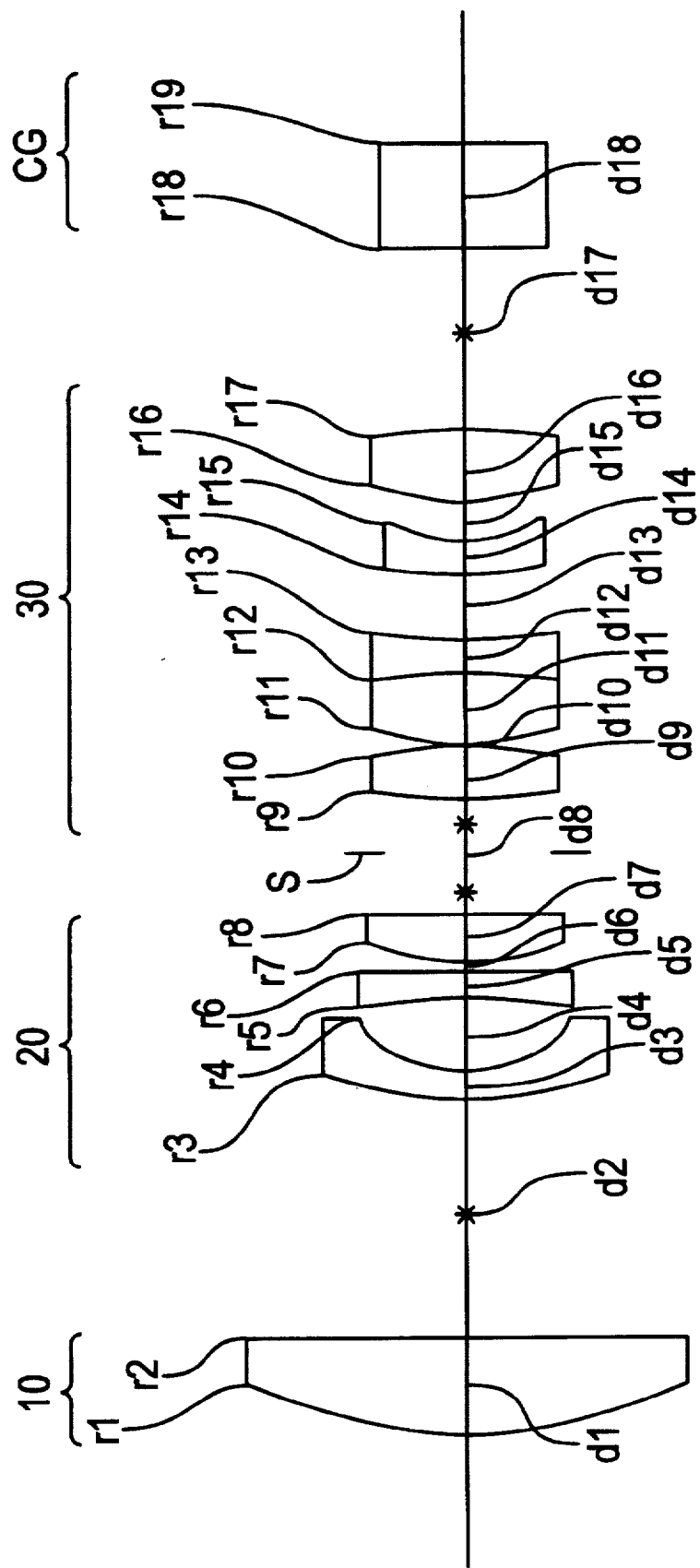
FIG. 24 is a schematic view showing the lens arrangement of the fourth embodiment of the zoom lens system at the longest focal length extremity, according to the present invention.
Figure 25:
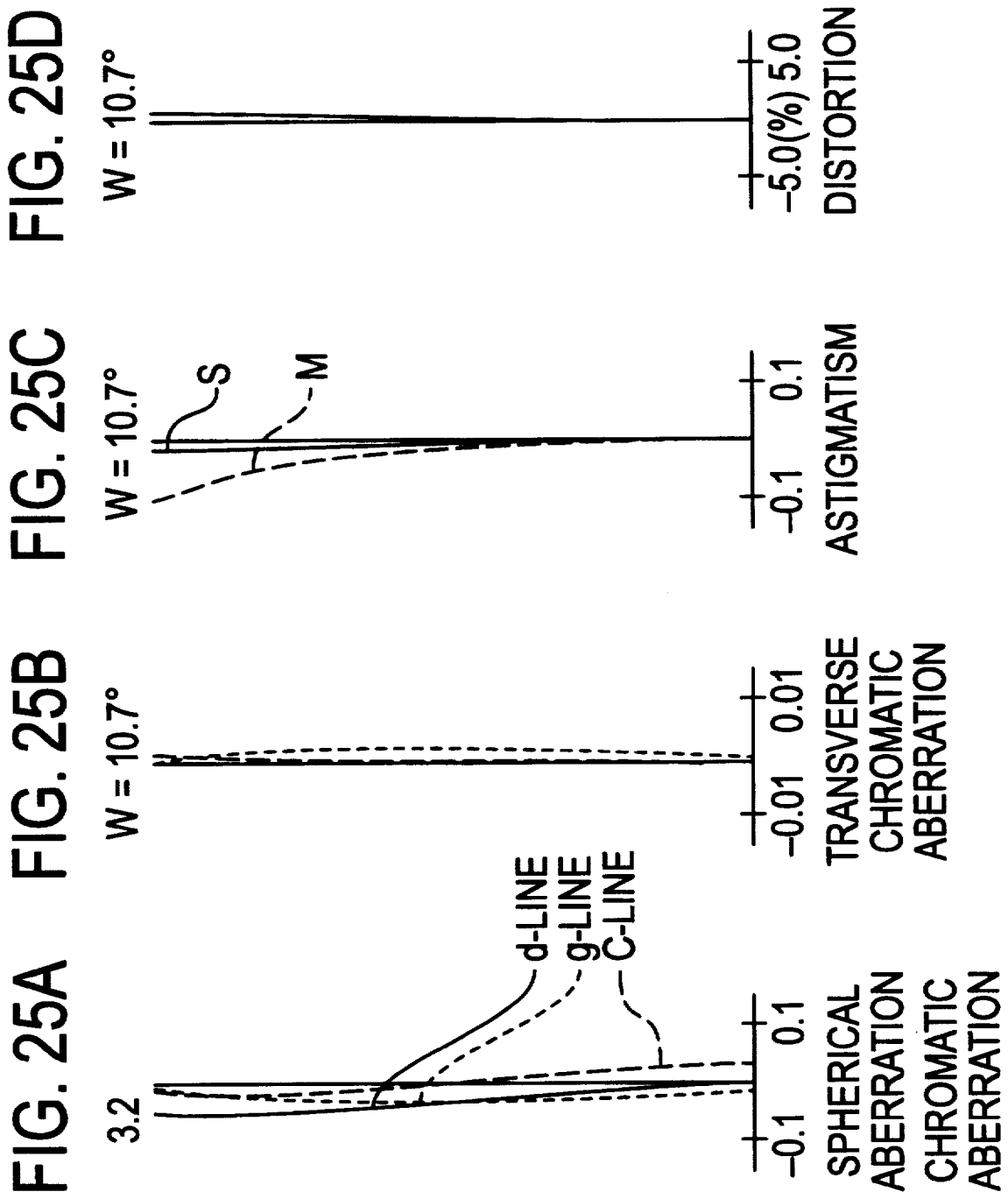
FIGS. 25A, 25B, 25C and 25D show aberration diagrams of the zoom lens system shown in FIG. 24.

FIGS. 20 through 25 show a fourth embodiment of a zoom lens system according to the present invention. FIGS. 20, 22 and 24 show a lens arrangement thereof at the shortest focal length extremity, an intermediate focal length, and The longest focal length extremity, respectively. In the fourth embodiment, the first positive lens group 10 is composed of a single lens element; the second negative lens group 20 is composed of three lens elements; and the third positive lens group 30 is composed of five lens elements including a cemented lens consisting of a positive lens element and a negative lens element. The diaphragm S is immovably located between the second and third lens groups 20 and 30. The surface No. r12 refers to the cemented surface of the cemented lens belonging to the third lens group. The surface Nos. r18 and r19 refer to the surfaces of the glass cover CG of the CCD. FIGS. 21A, 21B, 21C and 21D, FIGS. 23A, 23B, 23C and 23D and FIGS. 25A, 25B, 25C and 25D show aberration diagrams of the zoom lens system shown in FIGS. 20, 22 and 24, respectively.

Numerical data regarding the lens system of embodiment 4 is shown in Table 4 below.

TABLE 4

$F_{NO}$ = 1:2.4–2.7–3.2
f = 4.61–8.00–13.20 (zoom ratio;2.86)
W = 29.2–17.2–10.7
$f_B$ = 3.37–5.15–8.16(=(1.30–3.08–6.09) + (3.14/1.51633))

| Surface No. | R | D | Nd | vd |
|---|---|---|---|---|
| 1 | 17.093 | 3.02 | 1.48749 | 70.2 |
| 2 | 1100.000 | 1.76–6.14–7.91 | — | — |
| 3 | 19.175 | 1.00 | 1.80400 | 46.6 |
| 4 | 4.194 | 2.04 | — | — |
| 5 | −14.266 | 0.90 | 1.77250 | 49.6 |
| 6 | 63.482 | 0.10 | — | — |
| 7 | 9.100 | 1.57 | 1.84666 | 23.8 |
| 8 | 26.360 | 8.24–3.86–2.09 | — | — |
| diaphragm | ∞ | 6.30–4.52–1.51 | — | — |
| 9 | 11.050 | 1.83 | 1.80400 | 46.6 |
| 10 | −22.800 | 0.10 | — | — |
| 11 | 7.547 | 2.74 | 1.51633 | 64.1 |
| 12 | −7.547 | 1.00 | 1.84666 | 23.8 |
| 13 | 99.020 | 1.82 | — | — |
| 14 | 18.390 | 1.00 | 1.80518 | 25.4 |
| 15 | 4.000 | 1.48 | — | — |
| 16 | 6.818 | 2.12 | 1.74077 | 27.8 |
| 17 | −31.300 | 1.30–3.08–6.09 | — | — |
| 18 | ∞ | 3.14 | 1.51633 | 64.1 |
| 19 | ∞ | — | — | — |

EMBODIMENT 5

Figure 26:
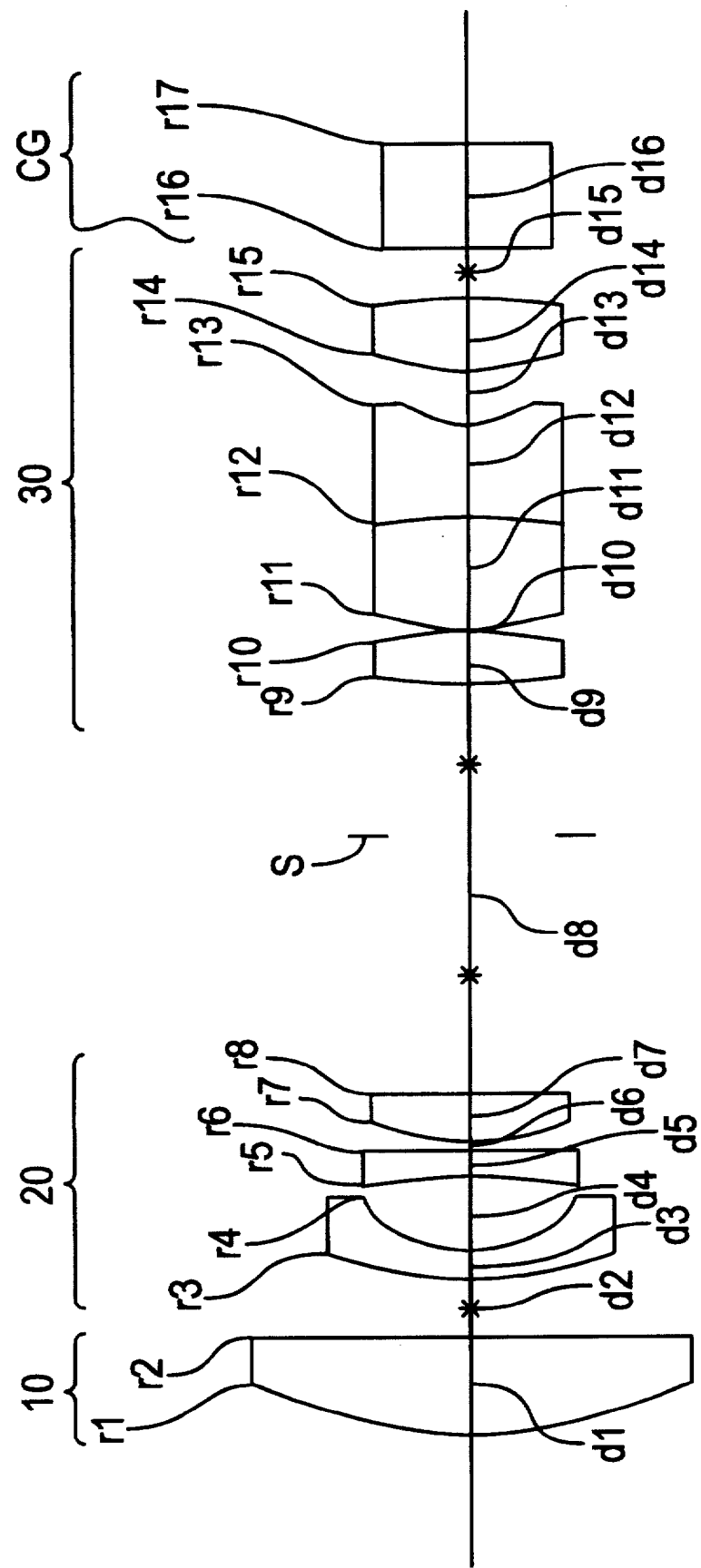
FIG. 26 is a schematic view showing the lens arrangement of a fifth embodiment of a zoom lens system at the shortest focal length extremity, according to the present invention.
Figure 28:
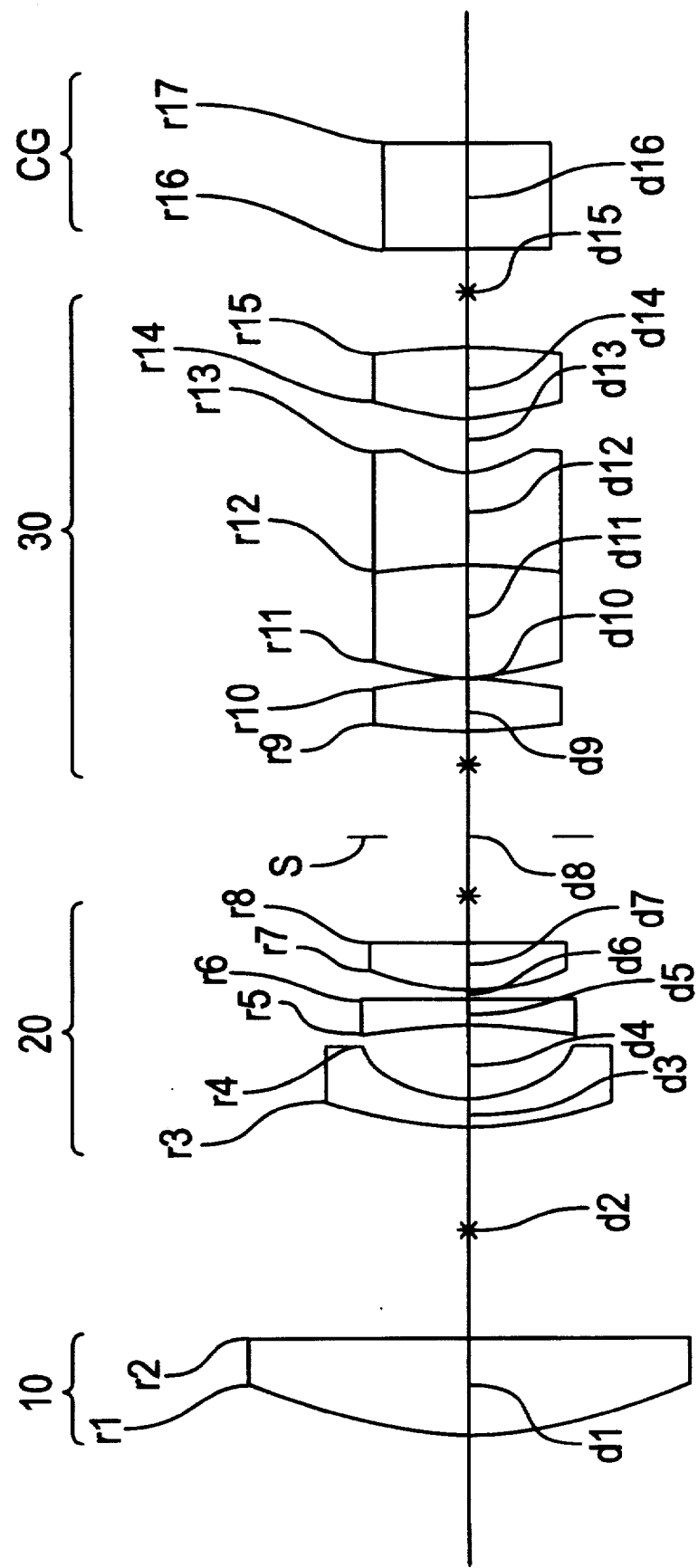
FIG. 28 is a schematic view showing the lens arrangement of the fifth embodiment of the zoom lens system at an intermediate focal length, according to the present invention.
Figure 29:
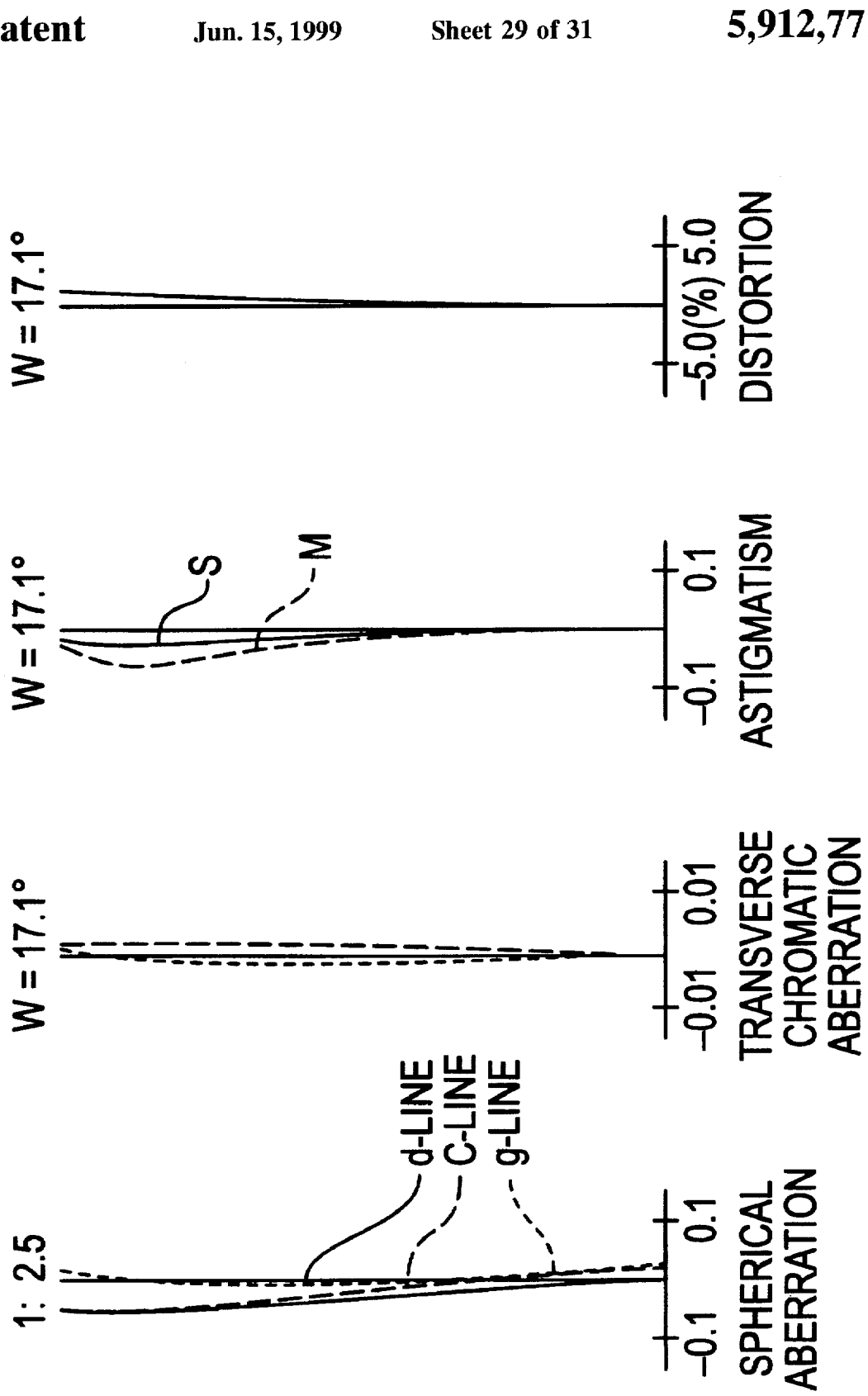
FIGS. 29A, 29B, 29C and 29D show aberration diagrams of the zoom lens system shown in FIG. 28.
Figure 30:
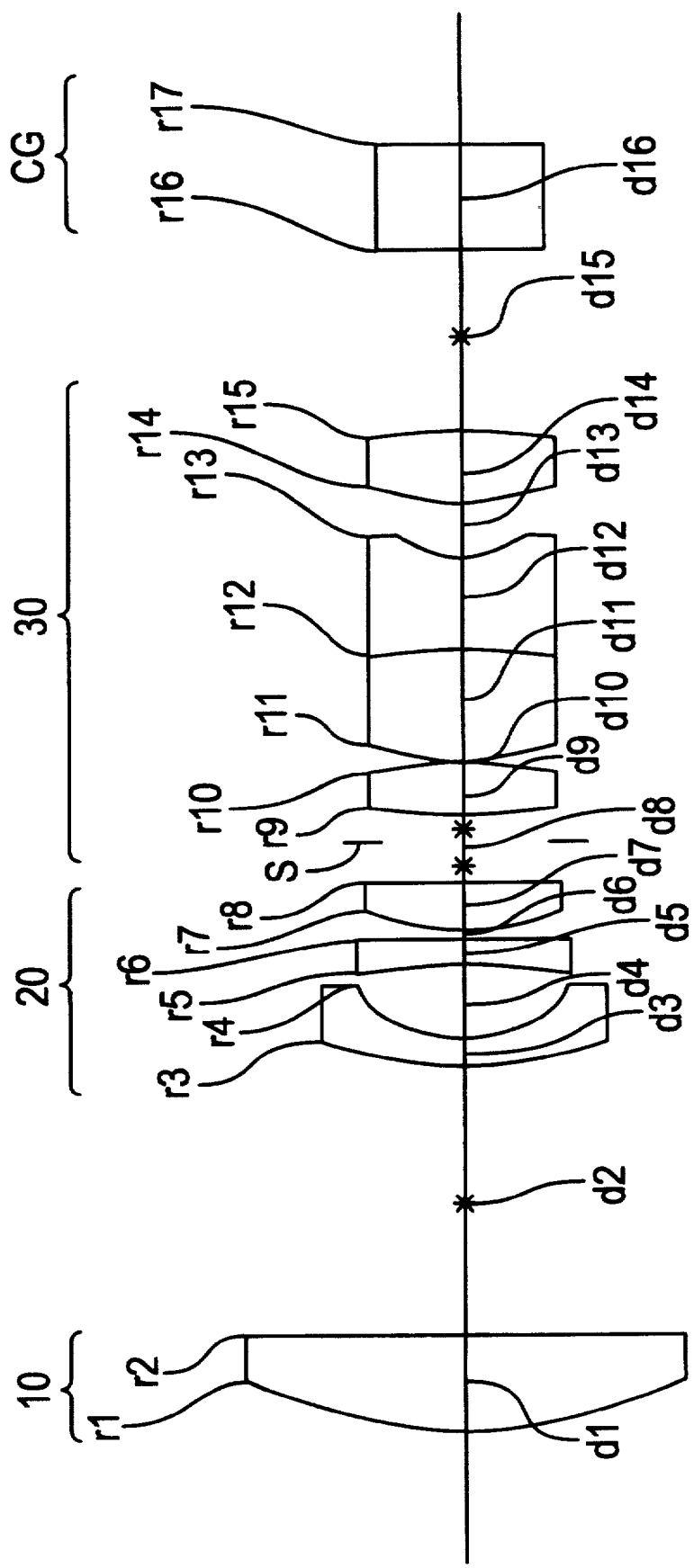
FIG. 30 is a schematic view showing the lens arrangement of the fifth embodiment of the zoom lens system at the longest focal length extremity, according to the present invention; and, FIGS. 31A, 31B, 31C and 31D show aberration diagrams of the zoom lens system shown in FIG. 30.

FIGS. 26 through 31 show a fifth embodiment of a zoom lens system according to the present invention. FIGS. 26, 28 and 30 show a lens arrangement thereof at the shortest focal length extremity, an intermediate focal length, and the longest focal length extremity, respectively. In the fifth embodiment, the first positive lens group 10 is composed of a single lens element; the second negative lens group 20 is composed of three lens elements; and the third positive lens group 30 is composed of four lens elements including a cemented lens consisting of a positive lens element and a negative lens element. The diaphragm S is immovably located between the second and third lens groups 20 and 30. The surface No. r12 refers to the cemented surface of the cemented lens belonging to the third lens group. The surface Nos. r16 and r17 refer to the surfaces of the glass cover CG of the CCD. FIGS. 27A, 27B, 27C and 27D, FIGS. 29A, 29B, 29C and 29D and FIGS. 31A, 31B, 31C and 31D show aberration diagrams of the zoom lens system shown in FIGS. 26, 28 and 30, respectively. Numerical data regarding the lens system of embodiment 5 is shown in Table 5 below.

TABLE 5

$F_{NO} = 1{:}2.2{-}2.5{-}2.8$
$f = 4.61{-}8.00{-}13.20$ (zoom ratio;2.86)
$W = 29.1{-}17.1{-}10.6$
$f_B = 3.57{-}5.09{-}7.51(=(1.50{-}3.02{-}5.44) + (3.14/1.51633))$

| Surface No. | R | D | Nd | νd |
|---|---|---|---|---|
| 1 | 15.780 | 3.08 | 1.48749 | 70.2 |
| 2 | 168.900 | 1.74–6.30–8.58 | — | — |
| 3 | 14.530 | 1.00 | 1.80400 | 46.6 |
| 4 | 4.080 | 2.07 | — | — |
| 5 | −13.310 | 0.90 | 1.77250 | 49.6 |
| 6 | 35.862 | 0.10 | — | — |
| 7 | 9.471 | 1.55 | 1.84666 | 23.8 |
| 8 | 42.800 | 8.03–3.47–1.20 | — | — |
| diaphragm | ∞ | 4.73–3.21–0.79 | — | — |
| 9 | 34.106 | 1.68 | 1.80400 | 46.6 |
| 10 | −13.120 | 0.10 | — | — |
| 11 | 5.743 | 3.54 | 1.60311 | 60.7 |
| 12 | −8.178 | 2.92 | 1.84666 | 23.8 |
| 13 | 4.000 | 1.55 | — | — |
| 14 | 8.583 | 2.32 | 1.75520 | 27.5 |
| 15 | −11.891 | 1.50–3.02–5.44 | — | — |
| 16 | ∞ | 3.14 | 1.51633 | 64.1 |
| 17 | ∞ | — | — | — |

Parameter values ($f_W$: the shortest focal length of the whole lens system, $L_{2-3}$: the distance between the principal points of the second and third lens groups at the shortest focal length extremity, $m_{2W}$: the lateral magnification of the second lens group at the shortest focal length extremity, $m_{2T}$: the lateral magnification of the second lens group at the longest focal length extremity) used to calculate the conditions (1) through (6) in the five embodiments and values of the ratios defined in the conditions (1) through (6) are shown in Table 6 below.

TABLE 6

| | embodiment 1 | embodiment 2 | embodiment 3 |
|---|---|---|---|
| $f_W$ | 4.631 | 4.610 | 4.610 |
| $L_{2-3}$ | 16.751 | 18.514 | 19.682 |
| $m_{2W}$ | −0.248 | −0.260 | −0.285 |
| $m_{2T}$ | −0.314 | −0.336 | −0.393 |
| condition(1) | 0.23 | 0.24 | 0.30 |
| condition(2) | 0.32 | 0.35 | 0.30 |
| condition(3) | 3.62 | 4.02 | 4.27 |
| condition(4) | 0.88 | 0.87 | 0.84 |
| condition(5) | 0.169 | 0.258 | 0.258 |
| condition(6) | 0.226 | 0.358 | 0.437 |

TABLE 6-continued

| | embodiment 4 | embodiment 5 |
|---|---|---|
| $f_W$ | 4.610 | 4.610 |
| $L_{2-3}$ | 19.772 | 19.108 |
| $m_{2W}$ | −0.278 | −0.295 |
| $m_{2T}$ | −0.372 | −0.414 |
| condition(1) | 0.28 | 0.32 |
| condition(2) | 0.38 | 0.38 |
| condition(3) | 4.29 | 4.14 |
| condition(4) | 0.73 | 0.77 |
| condition(5) | 0.330 | 0.244 |
| condition(6) | 0.610 | 0.565 |

As can be seen from Table 6, the numerical values of the first through fifth embodiments satisfy the conditions (1) through (6). Furthermore, aberrations at the shortest focal length extremity (the wide angle extremity), the intermediate focal length, and the longest focal length extremity (the telephoto extremity) are appropriately compensated in a good balance.

According to the present invention, a small zoom lens system having a zoom ratio of approximately 3, for a video camera or digital camera, etc., can be provided.

What is claimed is:

1. A zoom lens system comprising a positive first lens group, a negative second lens group, and a positive third lens group, arranged in this order from an object side, wherein said second and third lens groups move to carry out a zooming operation, and wherein said zoom lens system satisfies the following relationships:

$$0 < \log Z_2 / \log Z < 0.4$$

$$0.25 < d_{1-2}/f_W < 0.55$$

$$3 < L_{2-3}/f_W < 4.6$$

wherein $Z_2$ represents a ratio of the lateral magnification of said second lens group at a longest focal length extremity to a lateral magnification of said second lens group at a shortest focal length extremity, Z represents a ratio of the longest focal length of the whole lens system to the shortest focal length of said whole lens system, $f_W$ represents said shortest focal length of said zoom lens system, $d_{1-2}$ represents a distance between a last lens surface of said first lens group and a first lens surface of said second lens group at said shortest focal length extremity, and $L_{2-3}$ represents a distance between the principal points of said second and third lens groups at said shortest focal length extremity.

2. A zoom lens system according to claim 1, wherein the zoom lens system satisfies the following condition:

$$0.6 < f_{BW}/f_W < 1.5 \qquad (4)$$

wherein $f_{BW}$ represents the reduced back focal distance at said shortest focal length extremity.

3. A zoom lens system according to claim 1, wherein said third lens group includes a cemented lens consisting of a positive lens element and a negative lens element cemented together and satisfies the following conditions and:

$$0.16 < Nn - Np$$

$$0.2 < f_W/|r_c| < 0.7 \quad (r_c < 0)$$

wherein

Nn represents a refractive index of said negative lens element of said cemented lens, Np represents a refractive index of said positive lens element of said cemented lens, and $r_c$ represents a radius of curvature of the cemented surface of said cemented lens.

4. A zoom lens system according to claim 1, further comprising a diaphragm provided between said second lens group and said third lens group.

5. A zoom lens system according to claim 4, wherein said diaphragm moves together with said third lens group.

6. A zoom lens system according to claim 4, wherein said diaphragm is immovably positioned between said second and third lens groups so as not to move during said zooming operation.

7. A zoom lens system according to claim 1, wherein focusing is performed out by said second lens group.

8. A zoom lens system according to claim 1, wherein said first lens group does not move during said zooming operation or a focusing operation.

* * * * *